(12) United States Patent
To

(10) Patent No.: US 8,332,346 B1
(45) Date of Patent: Dec. 11, 2012

(54) FUZZY-LEARNING-BASED EXTRACTION OF TIME-SERIES BEHAVIOR

(75) Inventor: Wai Yip To, Hong Kong (HK)

(73) Assignee: Quest Software, Inc., Aliso Viejo, CA (US)

( * ) Notice: Subject to any disclaimer, the term of this patent is extended or adjusted under 35 U.S.C. 154(b) by 0 days.

(21) Appl. No.: 13/209,018

(22) Filed: Aug. 12, 2011

Related U.S. Application Data

(63) Continuation of application No. 12/023,920, filed on Jan. 31, 2008, now Pat. No. 8,001,074.

(51) Int. Cl.
*G06F 9/44* (2006.01)
*G06N 7/02* (2006.01)
*G06N 7/06* (2006.01)

(52) U.S. Cl. ......................................................... 706/52

(58) Field of Classification Search ...................... 706/52
See application file for complete search history.

(56) References Cited

U.S. PATENT DOCUMENTS

| | | | |
|---|---|---|---|
| 5,179,634 A | 1/1993 | Matsunaga et al. | |
| 7,640,055 B2 | 12/2009 | Geva et al. | |
| 8,001,074 B2 | 8/2011 | To | |
| 2006/0253790 A1* | 11/2006 | Ramarajan et al. | 715/764 |

OTHER PUBLICATIONS

Nozaki, Ken et al.; "A simple but powerful heuristic method for generating fuzzy rules from numerical data"; 1997; Elsevier; Fuzzy Sets and Systems 86; pp. 251-270.*

Chakrabarti, Kaushik; "Locally Adaptive Dimensionality Reduction for Indexing Large Time Series Databases"; Jun. 2002; ACM Transactions on Database Systems, vol. 27, No. 2; pp. 188-228.

Chiu, Stephen L.; Fuzzy Model Identification Based on Cluster Restimation; 1994; Journal of Intelligent and Fuzzy Systems, vol. 2; pp. 267-278.

Cordon et al., "A Multiobjective Genetic Algorithm for Feature Selection and Data Base Learning in Fuzzy-Rule Based Classification Systems."; Proceedings of the 9th International Conference on Information Processing and Management of Uncertainty in Knowledge-Based Systems, (IPMU 2002, Annecy, France, pp. 823-830, Sep. 2002), also available at http://sci2s.ugr.es/keel/pdf/keel/capitulo/villar-ipmu02.pdf (pp. 1-12).

Ester et al., "A Density-Based Algorithm for Discovering Clusters in Large Spatial Databases with Noise"; Proceedings of the Second Int'l Conference on Knowledge Discovery and Data Mining (KDD-96) (AAA1 Press, Portland, Oregon, 1996), pp. 226-231.

Ishibuchi, Hisao et al.; "Effect of Rule Weights in Fuzzy Rule-Based Classification Systems"; Aug. 2001; IEEE Transactions on Fuzzy Systems, vol. 9, No. 4; pp. 506-515.

(Continued)

*Primary Examiner* — Jeffrey A Gaffin
*Assistant Examiner* — Stanley K Hill
(74) *Attorney, Agent, or Firm* — Knobbe Martens Olson & Bear LLP

(57) ABSTRACT

Systems and methods for extracting or analyzing time-series behavior are described. Some embodiments of computer-implemented methods include generating fuzzy rules from time series data. Certain embodiments also include resolving conflicts between fuzzy rules according to how the data is clustered. Some embodiments further include extracting a model of the time-series behavior via defuzzification and making that model accessible. Advantageously, to resolve conflicts between fuzzy rules, some embodiments define Gaussian functions for each conflicting data point, sum the Gaussian functions according to how the conflicting data points are clustered, and resolve the conflict based on the results of summing the Gaussian functions. Some embodiments use both crisp and non-trivially fuzzy regions and/or both crisp and non-trivially fuzzy membership functions.

20 Claims, 20 Drawing Sheets

OTHER PUBLICATIONS

Jang, Hy-Shing R.; "ANFIS: Adaptive-Network-Based Fuzzy Inference System", 1993; IEEE Transactions on Systems, Man, and Cybernetics, vol. 23, No. 3; pp. 665-685.

Jang, Jyh-Shing et al.; Predicting Chaotic Time Series with Fuzzy If-Then Rules; 1993; Second IEEE International Conference on Fuzzy Systems; pp. 1079-1084.

Kim, Daijin et al.; "Forecasting Time Series with Genetic Fuzzy Predictor Ensembe"; Nov. 1997; IEEE Transactions on fuzzy systems, vol. 5, No. 4; pp. 523-535.

Kulkarni, "Chapter 3: Fuzzy Logic Fundamentals"; Computer Vision and Fuzzy-Neural Systems; (Prentice Hall, 2007), pp. 61-103.

Luger, "Chapter 9: Reasoning in Uncertain Situations"; Artificial Intelligence: Structures and Strategies for Complex Problem Solving ; (Addison-Wesley, Harlow, England, 5th ed., 2004), pp. 333-383.

Negnevitsky, Artificial Intelligence: A Guide to Intelligent Systems; "Chapter 4: Fuzzy Expert Systems"; (Addison-Wesley, 2nd ed., 2005), pp. 88-129.

Tran et al., "Automatic ARIMA Time Series Modeling for Adaptive I/O Prefetching"; IEEE Transactions on Parallel and Distributed Systems, (The IEEE Computer Society, vol. 15, No. 14, Apr. 2004), pp. 362-377.

Wang and Mendel, "Generating Fuzzy Rules by Learning from Examples"; IEEE Transactions on Systems, Man, And Cybernetics, (vol. 22, No. 6, Nov./Dec. 1992), pp. 1414-1427.

Wang, "Chapter 12: Design of Fuzzy Systems Using a Table Look-Up Scheme"; A Course in Fuzzy Systems & Control, (Prentice Hall PTR, 1st ed., 1996), pp. 153-167.

Yue et al., "Using Greedy algorithm: DBSCAN Revisited II"; Journal of Zhejiang University Science, (2004), pp. 1405-1412.

* cited by examiner

FUZZY-LEARNING-BASED EXTRACTION OF TIME-SERIES BEHAVIOR

This application is a continuation of U.S. application Ser. No. 12/023,920, filed Jan. 31, 2008, entitled "Fuzzy-Learning-Based Extraction of Time-Series Behavior", the entirety of which is hereby incorporated herein by reference and is to be considered part of this specification.

BACKGROUND

1. Field

Certain embodiments relate to extraction of time-series behavior.

2. Description of the Related Art

Time-series prediction and time-series-trend recognition are problems of significant practical importance having a wide variety of applications spanning many fields, including, for example, signal processing, social science analysis, geology, astrophysics, weather forecasting, stock market analysis and workload projections.

Conventional approaches to time-series analysis include the use of autoregressive integrated moving average (ARIMA) models, Gabor polynomials and neural networks. Each conventional approach has serious disadvantages that render it an undesirable method of time-series analysis for certain applications. For example, ARIMA is a complex, sophisticated technique that is time-consuming, computationally intensive and requires a relatively large amount of training data to perform well. Moreover, ARIMA relies on autoregression that is not useful when the relationship between data points is weak.

By way of example, in the context of a relational database management system (RDBMS), it is often desirable to monitor a number of different indicators of the usage of the RDBMS. One such indicator might be central processing unit (CPU) utilization. For instance, a time series representing the hourly CPU-utilization over a week can provide valuable information on how a database application was used within the week, such as which day of the week featured heaviest use of the application.

Conventional tools for time-series analysis, however, do not perform well for many RDBMS-based time series such as CPU utilization. This poor performance stems in part from the fact that typically the data in an RDBMS-based time series, such as CPU utilization, exhibits only a weak relationship, if any, between the values of consecutive data points. As an example, the fact that CPU utilization is high during a given hour typically does not imply anything about CPU utilization for the next hour or the hour after that. Instead, time-related values such as the time of day are often more important for RDBMS-based time series because variability in human behavior plays a significant role in driving the patterns and trends in the monitored data. For instance, for an RDBMS used in a stock brokerage system, there may typically be daily peaks in CPU utilization around, say, 1:30 P.M. and 3:30 P.M., corresponding, respectively, to a high number of users logging into the system after lunch and to a high number of transactions performed before the stock market closes for the day at 4:00 P.M. Similarly, there may typically be a period of low CPU utilization from about 12:15 P.M. to 1:15 P.M., corresponding to system users taking their lunch breaks. These peaks and valleys are likely to occur regardless of how much the CPU is used through the rest of the day—e.g., regardless of whether trading throughout the rest of the day is frenzied or slow. Such behavior typically has much less to do with CPU utilization in the preceding hours than it does with human behavior caused by the time of day. As a result, conventional approaches to time-series analysis like ARIMA, which do not take into account time-related values like time of day, will not extract such daily behavior well. This is particularly true when there is little data available for training or the behavior extraction needs to be performed in a relatively short time. Even when consecutive data points exhibit a stronger relationship, conventional tools like ARIMA and neural networks are still relatively slow, computationally intensive methods of analysis.

SUMMARY

These and other problems are solved by systems and methods that extract time-series behavior in situations where the time-series behavior is due in substantial part to repeated events in the presence of uncertainty, such as, for example, human behavior in response to time-related values. In one embodiment, the system extracts time-series behavior in situations where extraction must be done relatively quickly or where there is relatively little training data.

Various embodiments address one or more of these needs. In some embodiments, a computer-implemented method of extracting time-series behavior is disclosed, where each time-series data point has at least one input component and at least one output component. The method includes loading the time-series data and dividing into fuzzy regions a range of possible values for each component of the data. The method further includes assigning a fuzzy membership function to each fuzzy region. The method further includes generating non-conflicting fuzzy rules that are determined at least in part by the fuzzy membership functions and at least in part by how a plurality of the time-series data points are clustered. In one embodiment, the method further includes determining a mapping (e.g., function, model) from an input space to an output space based on defuzzification of the fuzzy rules. Moreover, the method further includes making computation of the mapping as applied to a given input accessible to a user such that the user can use such computations to perform time-series prediction and/or time-series trend-recognition.

In some embodiments, a computer-implemented method of extracting time-series behavior is disclosed, where the time-series data points have one or more input components and one or more output components. The method includes dividing into fuzzy regions a range of possible values for each component of the time-series data and assigning a fuzzy membership function to each fuzzy region. The method further includes using a first increment of time-series data to build a Fuzzy Associated Memory (FAM) bank whose fuzzy rules are determined at least in part by the fuzzy membership functions and at least in part by the way a plurality of the time-series data points of the first increment of time-series data are clustered. The method also includes providing a model of the behavior of the first increment of time-series data in a manner that allows a user to perform time-series prediction or time-series-trend recognition. In some of these embodiments, the method further includes updating the model based on at least a second increment of time-series data, wherein updating the model does not require reexamining the time-series data points of the first increment of time-series data.

In certain embodiments, an apparatus is disclosed for analyzing time-series behavior. The apparatus includes first and second computer systems. A first code module that is loaded into the memory of the first computer system is in communication with a database. A second code module that is loaded into the memory of the second computer system communicates with the first code module so that it can retrieve time-series data from the database. The second code module extracts a model of the behavior of the time series via fuzzy learning based in part on how conflicting data points of the retrieved data are clustered. The second code module also makes the extracted model accessible to a user such that the user can use the model to perform time-series analysis. In some embodiments, the second code module resolves conflicts between fuzzy rules based on summing Gaussian functions that are defined by the output components of conflicting data points, where the sums are calculated according to how the output components are clustered.

For purposes of summarizing the disclosure, certain aspects, advantages and novel features of the inventions have been described herein. It is to be understood that not necessarily all such advantages may be achieved in accordance with any particular embodiment. Thus, the invention may be embodied or carried out in a manner that achieves or optimizes one advantage or group of advantages as taught herein without necessarily achieving other advantages as may be taught or suggested herein.

DETAILED DESCRIPTION

For purposes of the present disclosure, it should be understood that the phrase "time series" is used broadly and encompasses, but is not limited to, a sequence of values of one or more variables, typically measured, produced, observed or otherwise recorded at the beginning or end of successive and often uniformly-spaced time intervals (hereinafter "a standard time series"); information that can be arranged as a standard time series; and information that can be arranged in a manner substantially complying with the above definition of a standard time series. Moreover, for purposes of the present disclosure, it should be understood that the word "extract" is used broadly and that extracting time-series behavior encompasses, but is not limited to, locating localized behavior (such as highest average value over a certain period of time) within a time series; detecting patterns or repeated behavior within a time series; detecting trends in a time series; and producing models for predicting future segments of a time series. Furthermore, as used herein, "fuzzy" includes "crisp." For example, fuzzy regions and fuzzy membership functions include non-overlapping or crisp regions and crisp membership functions, respectively. "Non-trivially fuzzy" and its variants will be used to refer to things that are fuzzy but not crisp.

Methods and processes described herein are not limited to any particular sequence, and the blocks or states relating thereto can be performed in other sequences that are appropriate. For example, described blocks or states may be performed in an order other than that specifically disclosed, or multiple blocks or states may be combined in a single block or state.

Figure 1:
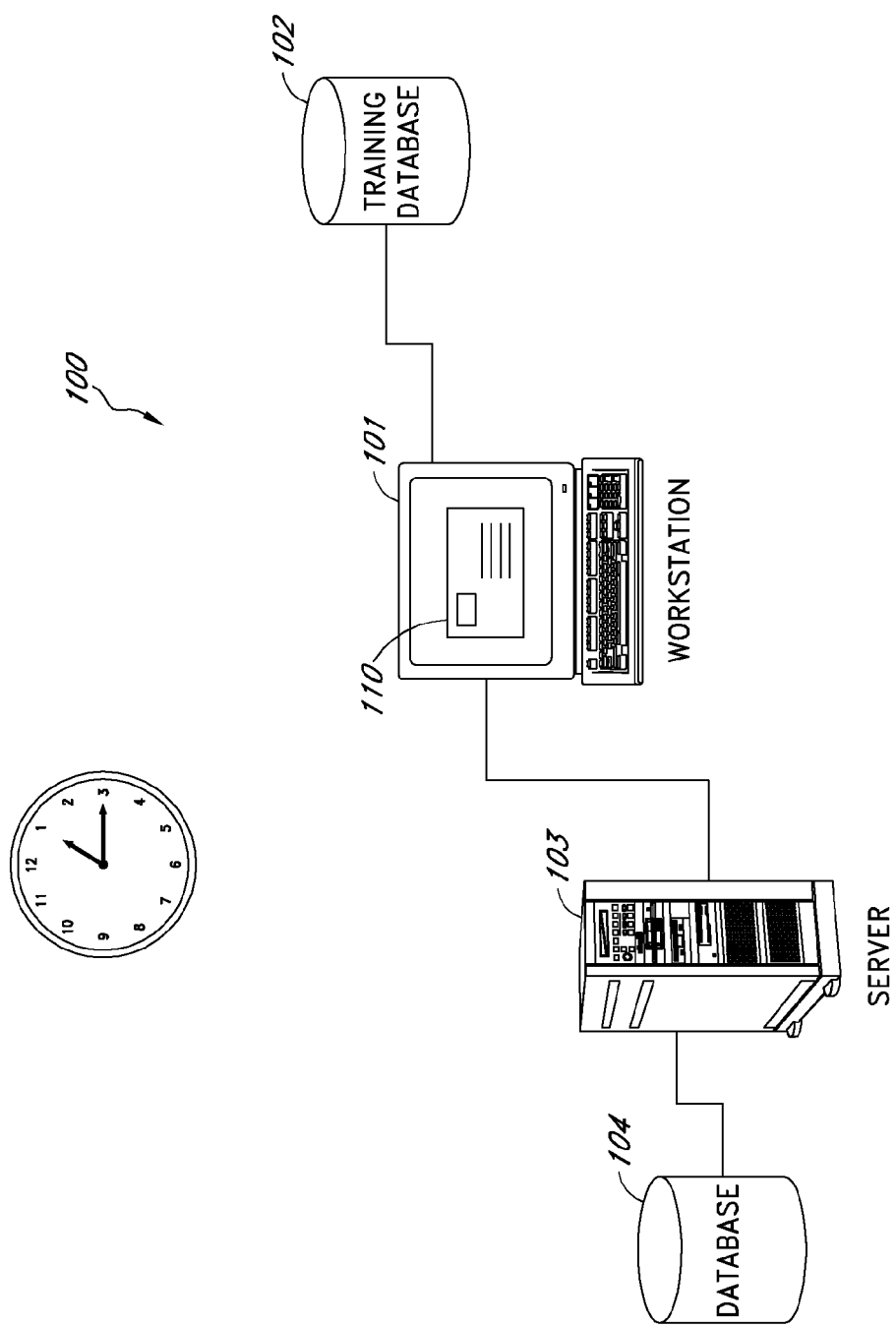
FIG. 1 illustrates one embodiment of a system for extracting time-series behavior.

FIG. 1 illustrates a system for extracting time-series behavior. As shown in FIG. 1, the system includes a workstation 101 in communication with a training database 102. The workstation 101 can be a single computer or server or can be distributed among multiple computers or servers coupled by a network. In certain embodiments, the training database 102 resides in a location distinct from the workstation 101. In other embodiments, the training database 102 is part of the workstation 101. In some embodiments, the workstation 101 features a user interface 110 that allows a user to control or at least view some aspects of the extraction of time-series behavior. In other embodiments, a user interface is not necessary because, for example, the extraction of time-series behavior is fully automated.

In some embodiments, the workstation 101 is in communication with a server 103, which can be a single server or a distribution of servers. In some of these embodiments, as well as in others not featuring a server 103, the workstation 101 is in communication with a database 104. In some embodiments, the database 104 resides on the server 103. Moreover, in some embodiments the database 104 and/or the server 103 is part of the workstation 101.

Figure 2:
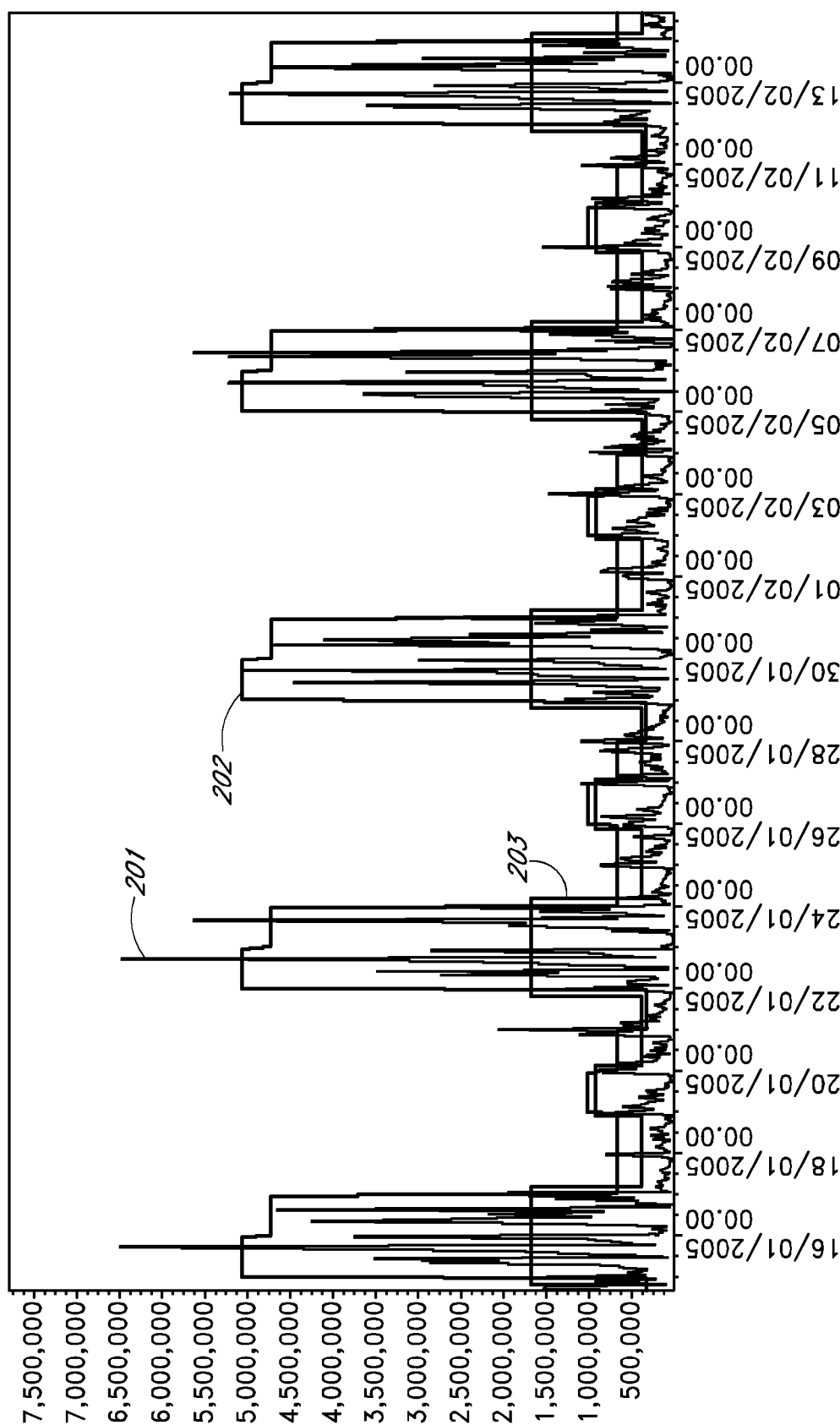
FIG. 2 provides a graphical representation of a time series and graphical representations of models of the behavior exhibited by the time series.

FIG. 2 provides a graphical representation 201 of a time series, a graphical representation 202 of a first model of the behavior exhibited by the time series, and a graphical representation 203 of a second model of the behavior exhibited by the time series. The graphical representation 201 of the time series features large peaks at intervals of approximately seven days. Correspondingly, the graphical representation 202 of the first model features peaks at intervals of approximately seven days. The graphical representation 203 of the second model also features regularly spaced peaks. The peaks of the graphical representation 203 of the second model, however, are not as large as those of the graphical representation 202 of the first model, indicating that the second model is less sensitive to large output values within the time series than is the first model. In some embodiments, a graphical representation of a model like the graphical representation 202 of the first model of FIG. 2 is displayed on the workstation 101 of FIG. 1 after extracting behavior from a time series like the time series graphically represented in FIG. 2. In some of the same embodiments and in other embodiments, a graphical representation of a model like the graphical representation 203 of the second model of FIG. 2 is displayed on the workstation 101 of FIG. 1 after extracting behavior from a time series like the time series graphically represented in FIG. 2.

Figure 3:
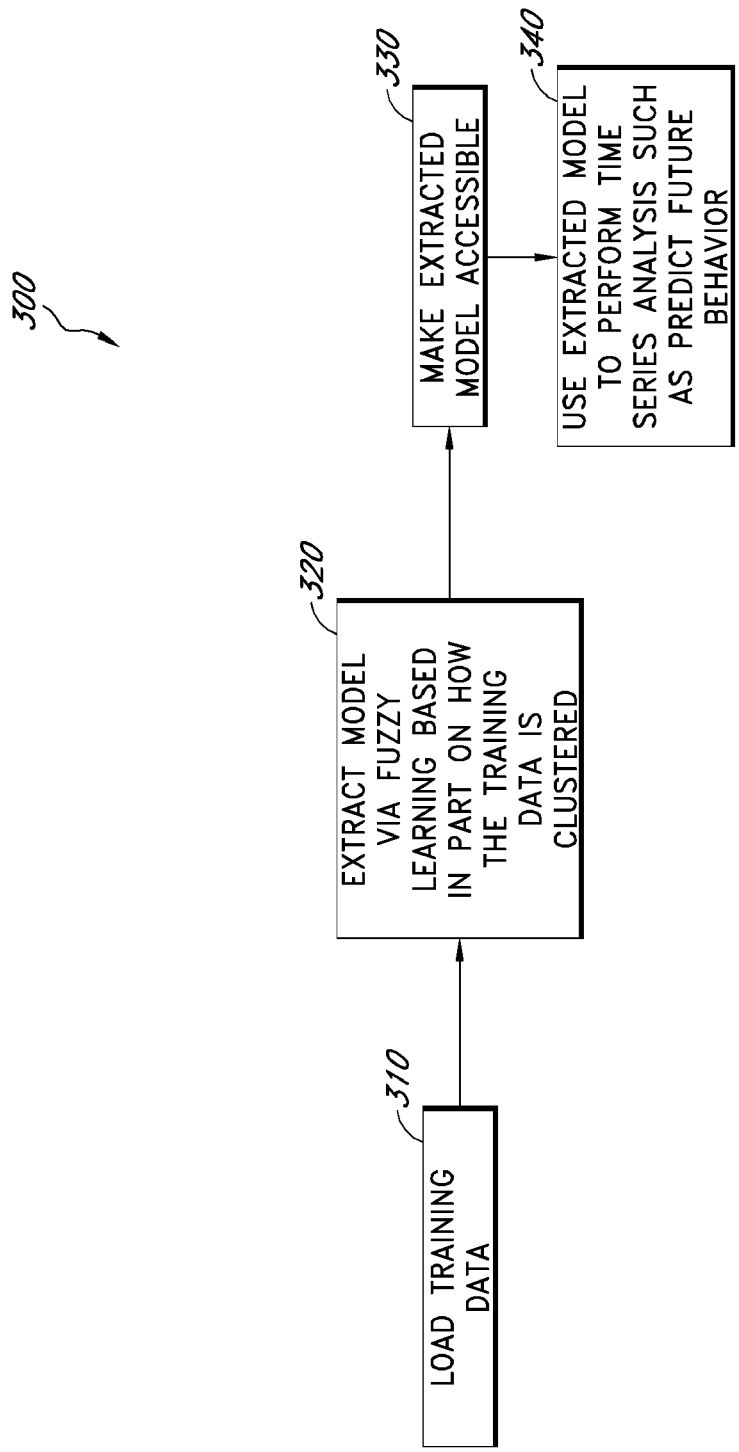
FIG. 3 is a flowchart of one embodiment of a process for extracting time-series behavior where fuzzy learning is used and is based in part on how the time-series data is clustered.
Figure 7A:
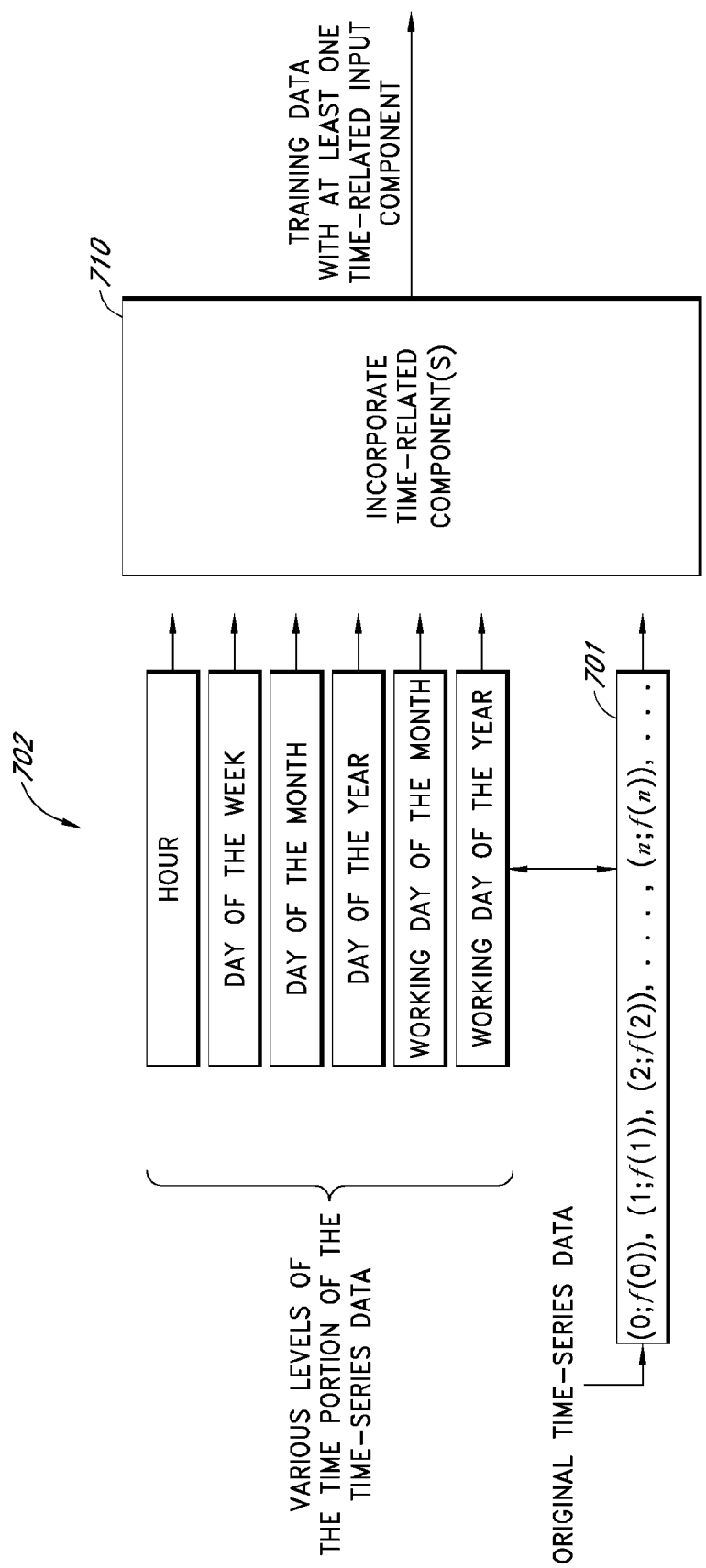
FIG. 7A illustrates extraction of various time-related components from the original time-series data and incorporation of these time-related components into the training data.

FIG. 3 is a flowchart of an embodiment of an extraction process 300 performable, for example, by the system 100 of FIG. 1. In general, the extraction process 300 includes a process for extracting time-series behavior. In FIG. 3, beginning at a first Block 310, the process 300 loads time-series data to be used as training data. In some embodiments, the first Block 310 retrieves the training data from a database like the training database 102 of FIG. 1 in chunks of a plurality of data points at a time. In such embodiments, the process 300 can perform some of the tasks falling under a second Block 320 before returning to the first Block 310 to retrieve more training data. In other embodiments, the first Block 310 can include retrieving all the data at once. Moreover, certain embodiments of the first Block 310 can further include extracting at least one time-related component of at least one data point as illustrated in FIG. 7A and as further discussed below.

FIG. 3 shows that next, at the second Block 320, the process 300 extracts a model of the time series via fuzzy learning, wherein the fuzzy learning depends in part on the way the training data is clustered. For purposes of the present disclosure, it should be understood that the word "model" is used broadly and that extracting a model of the time series encompasses, but is not limited to, (1) generating a Fuzzy Associated Memory (FAM) bank made up of fuzzy rules; (2) defining functions or sequences of values that are approximations of or that generalize the training data; and (3) defining functions that can be used to predict future behavior of the time series from which the training data originated or other time series.

FIG. 3 shows that next, at a third Block 330, the process 300 makes the model extracted in the second Block 320 accessible. For purposes of the present disclosure, it should be understood that the word "accessible" is used broadly. For example, in some embodiments, the third Block 330 can include providing an interface to the model so that a user can provide an arbitrary input within the appropriate range of input values and receive the output value that the model assigns to that input value. Similarly, in some embodiments, the third Block 330 can include providing a handle or pointer to a function that can be used by another application or code module to calculate the output value assigned by the model to a given input value. Furthermore, in certain embodiments, the third Block 330 can include providing a visual depiction of the model extracted in the second Block 320. In some embodiments, the third Block 330 can include displaying or otherwise outputting a table or spreadsheet of input and output values that are associated with one another according to the extracted model. Similarly, in some embodiments for which the extracted model is a FAM bank, the third Block 330 can include displaying or otherwise outputting a table or matrix (which may need to be of more than two dimensions) of fuzzy regions or fuzzy labels related to one another according to the FAM bank.

FIG. 3 shows that next, at a fourth Block 340, the process 300 includes using the model extracted in the second Block 320 and made accessible in the third Block 330 to analyze the time series. Thus, in some embodiments, the fourth Block 340 can include using the extracted model for predictive purposes whereas in other embodiments the fourth Block 340 can include using the extracted model for analyzing past behavior. As will be apparent to one of skill in the art, still other embodiments exist featuring different embodiments of the fourth Block 340.

In other embodiments, the process 300 can include more or fewer blocks than those depicted in FIG. 3, or the same number but with different blocks. For instance, in some embodiments, the process 300 can further include generating the training data or applying a filter to selectively retrieve training data; in these embodiments and others, the process 300 can also not include, e.g., the fourth Block 340.

Figure 4:
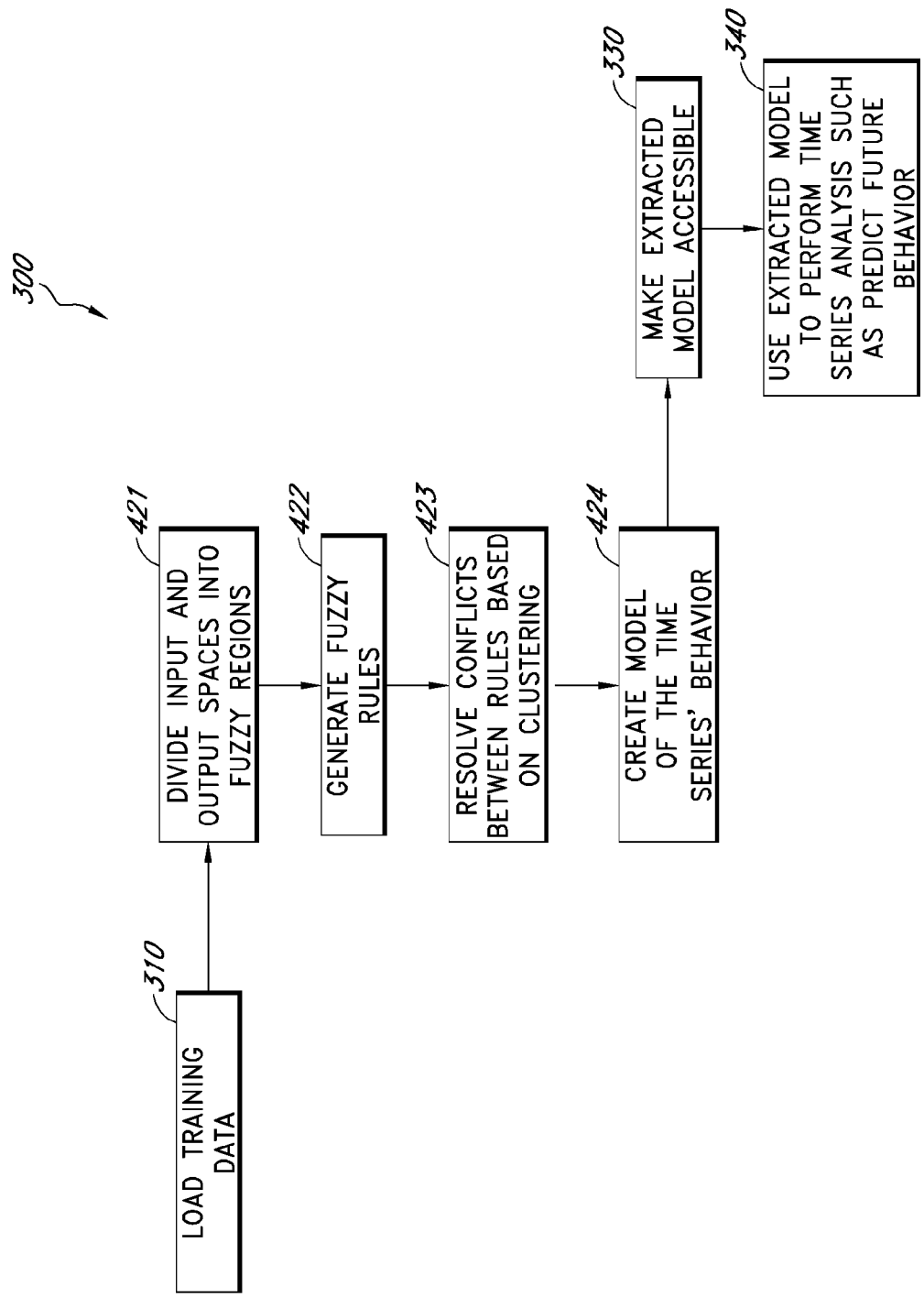
FIG. 4 is a flowchart of one embodiment of a process for extracting time-series behavior where conflicts between fuzzy rules are resolved based on the clustering of training data.

FIG. 4 illustrates further details of one embodiment. In particular, second through fifth Blocks 421-424 illustrate further details of what the second Block 320 of FIG. 3 can include in various embodiments including the embodiment depicted in FIG. 3. In FIG. 4, beginning at a first Block 310, the process 300 loads the training data. Next in FIG. 4, at the second Block 421, the process 300 divides the input and output spaces into fuzzy regions. That is, for each component of the time series (whether it be one of the one or more input components or one of the one or more output components), the process 300 divides the range of possible values of that component into fuzzy regions according to any appropriate method for fuzzy learning techniques. For example, it is common to divide a component-space into $2m+1$ overlapping regions, for some positive integer number m, using "triangular" membership functions for each region. Such a division is just one way of dividing a range of possible values, however. Some embodiments use differently shaped membership functions; divide a component space into not necessarily overlapping regions; or divide the component space into some number of regions that is not of the form $2m+1$. Moreover, two component spaces can be divided into a different number of regions. Additionally, at the second Block 421, the process 300 can assign labels (or fuzzy values of the component) to the fuzzy regions of each component space in some embodiments. For the sake of clarity, when examples are discussed in this disclosure it will sometimes be assumed that each fuzzy region is associated with such a label, even though some embodiments do not require such a labeling. For example, if one output component represents CPU utilization, then some of the fuzzy regions of this component space might be labeled "low," "medium" and "high."

FIG. 4 shows that next, at the third Block 422, the process 300 generates fuzzy rules. In some embodiments, the fuzzy rules are generated from the training data. In other embodiments, some fuzzy rules are generated from other sources such as user input. In general, fuzzy rules are of the form "IF . . . THEN . . . " and thus have two parts for the purposes of this discussion: everything preceding the "THEN" is part of the antecedent clause and everything else is part of the consequent clause. Some embodiments generate rules in the following way: If the data points of the time series are generally of the form $(x_1, \ldots, x_n; y_1, \ldots, y_m)$, with the semicolon separating input components on the left from output components on the right, then a data point with values $(a_1, \ldots a_n; b_1, \ldots, b_m)$ generates a rule substantially of the form IF $x_1$ is $R(a_1)$ [operator] . . . [operator] $x_n$ is $R(a_n)$ THEN $y_1$ is $R(b_1)$ [operator] . . . [operator] $y_m$ is $R(b_m)$, where R(c) denotes the fuzzy region (or label associated with the fuzzy region) for which the component value c has the highest degree of membership, and where each "[operator]" represents some logical operation such as logical AND or logical OR (not necessarily the same logical operation for each instance of "[operator]"). As a more concrete example, if the data points of the time series are of the form (day, time_of_day; CPU_utilization) then one fuzzy rule that could be generated from a data point (Monday, 8:57 AM; 90 percent) might be:

IF the day is "Monday" AND the time is "9:00 A.M."
  THEN CPU utilization is "high".

In this example, it is assumed that "Monday," "9:00 A.M." and "high" are the labels of the fuzzy regions in which the three components of the data point respectively have highest degrees of membership.

Once fuzzy rules are generated from the training data (or, alternatively, as they are being generated), the process 300 shown in FIG. 4 applies some criteria to resolve conflicts between fuzzy rules. Two rules conflict if their antecedent clauses are the same but their consequent clauses differ. By way of example, if Rule 1 is IF the day is "Monday" AND the time is "9:00 A.M."
  THEN CPU utilization is "high", Rule 2 is IF the day is "Monday" AND the time is "9:00 A.M."
  THEN CPU utilization is "low", and Rule 3 is IF the day is "Tuesday" AND the time is "9:00 A.M."
  THEN CPU utilization is "medium", then Rules 1 and 2 conflict, but neither conflicts with Rule 3. Two data points conflict if they lead to conflicting fuzzy rules.

Thus, FIG. 4 shows that next, at the fourth Block 423, the process 300 resolves conflicts between fuzzy rules based on the way the data points are clustered. In some embodiments, the fourth Block 423 includes different sub-processes. Some such embodiments are discussed further below in the discussion of FIGS. 8-10.

FIG. 4 shows that next, at the fifth Block 424, the process 300 produces a model of the time series' behavior. In some embodiments, this model is a FAM bank consisting of the fuzzy rules remaining after conflict resolution. In other embodiments, the process 300 creates a model by "defuzzifying" the fuzzy rules remaining after conflict resolution or those belonging to a related FAM bank so as to create a function that takes arbitrary values for all input components of the time series (arbitrary within the defined possible ranges for each component) and returns precise (as opposed to fuzzy) values for all output components based on the fuzzy rules that have been learned. Various defuzzification strategies are known in the art and no one in particular is required for such embodiments. One example of a defuzzification strategy is described in Wang and Mendel, "Generating Fuzzy Rules by Learning from Examples," IEEE Transactions on Systems, Man, and Cybernetics, Vol. 22, No. 6, pp. 1414-1427, November/December 1992, which is hereby incorporated by reference in its entirety.

Next in FIG. 4, at a sixth Block 330, the process 300 makes the model extracted in the fifth Block 424 accessible. FIG. 4 shows that next, at a seventh Block 340, the process 300 includes using the model extracted in the fifth Block 424 and made accessible in the sixth Block 330 to analyze the time series.

Figure 5:
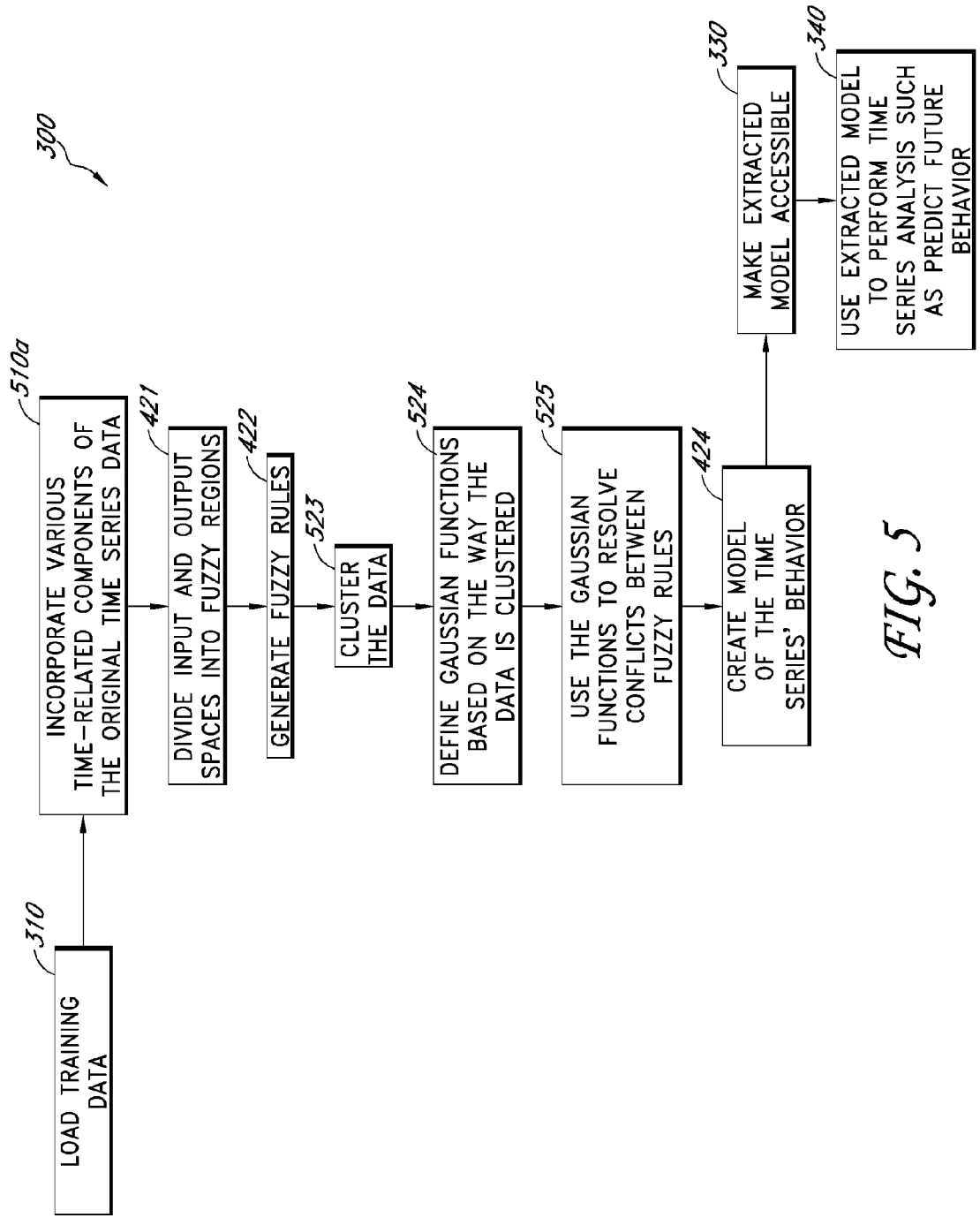
FIG. 5 is a flowchart of one embodiment of a process for extracting time-series behavior where Gaussian functions are used to resolve conflicts between fuzzy rules.

FIG. 5 illustrates one embodiment. Beginning at a first Block 310, a process 300 loads the training data. FIG. 5 shows that next, at a second Block 510a, the process 300 incorporates various time-related components of the original time series data as part of the training data. The discussion of FIG. 7A below discusses some embodiments of the second Block 510a. FIG. 5 shows that next, at a third Block 421, the process 300 divides the input and output spaces into fuzzy regions. Next in FIG. 5, at a fourth Block 422, the process 300 generates fuzzy rules. FIG. 5 shows that next, at a fifth Block 523, the process 300 clusters the training data. The discussion of FIGS. 8-11 below discusses some embodiments of the fifth Block 523. Next in FIG. 5, at a sixth Block 524, the process 300 defines Gaussian functions based on the way the data is clustered in the fifth Block 523. The discussion of FIGS. 8-11 below discusses some embodiments of the sixth Block 524. Next in FIG. 5, at a seventh Block 525, the process 300 uses the Gaussian functions defined in the sixth Block 524 to resolve conflicts between fuzzy rules. The discussion of FIGS. 8-11 below discusses some embodiments of the seventh Block 525. FIG. 5 shows that next, at an eighth Block 424, the process 300 produces a model of the time series' behavior. Next in FIG. 5, at a ninth Block 330, the process 300 makes the model extracted in the eighth Block 424 accessible. FIG. 5 shows that next, at a tenth Block 340, the process 300 includes using the model extracted in the eighth Block 424 and made accessible in the ninth Block 330 to analyze the time series.

Figure 6:
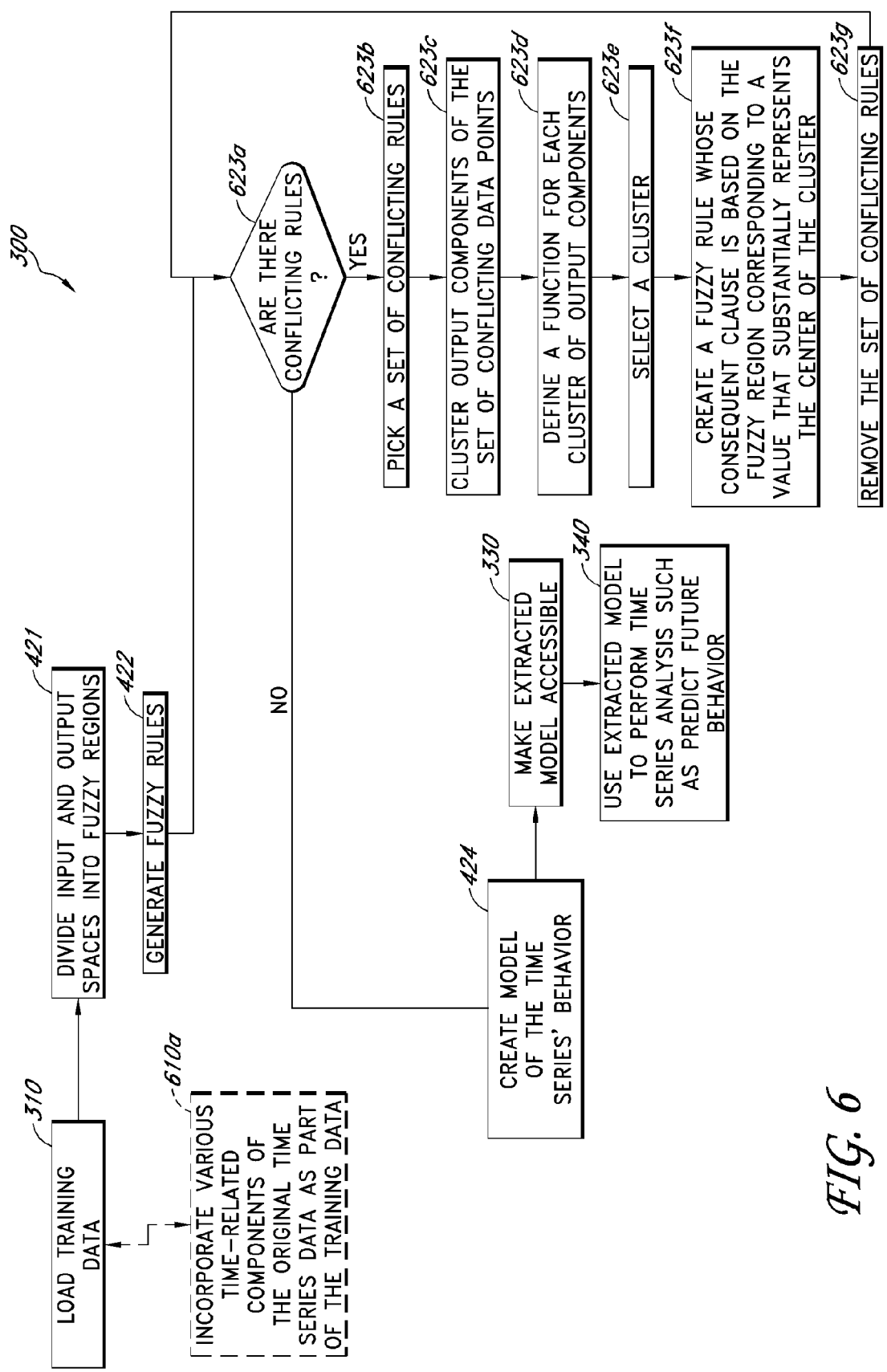
FIG. 6 is a flowchart of one embodiment of a process for extracting time-series behavior where conflicting fuzzy rules are replaced with a rule determined by the clustering of the conflicting training data.

FIG. 6 illustrates further details of one embodiment. In particular, in FIG. 6, beginning at a first Block 310, the process 300 loads the training data and can also perform the operations at a second Block 610a. That is, before or while loading the training data, the process 300 can incorporate various time-related components of the original time series data as part of the training data. The discussion of FIG. 7A below discusses some embodiments of the second Block 610a.

Moreover, fifth through eleventh Blocks 623a-623g of FIG. 6 illustrate further details of what the fourth Block 423 of FIG. 4 can include in various embodiments including the embodiment depicted in FIG. 4. In FIG. 6, after the first Block 310, the process 300 next, at a third Block 421, divides the input and output spaces into fuzzy regions and then, at a fourth Block 422, the process 300 generates fuzzy rules. Next in FIG. 6, at the fifth Block 623a, the process 300 determines whether there are any conflicting rules. If so, then next in FIG. 6, at the sixth Block 623b, the process 300 picks a set of conflicting rules. Next in FIG. 6, at the seventh Block 623c, the process 300 clusters the output components of all data points that gave rise to the conflicting rules in the set selected at the sixth Block 623b. Next in FIG. 6, at the eighth Block 623d, the process 300 behaves as follows: for each cluster produced at the seventh Block 623c, the process 300 defines a function for the cluster such that at least some properties of the cluster (e.g., the density of the cluster or the number of points in the cluster) determine some properties of the function (e.g., the maximum value of the function or the number of relative maxima that the function has). FIG. 6 shows that next, at the ninth Block 623e, the process 300 chooses a cluster based on the properties of the functions defined at the eighth Block 623d (e.g., in one embodiment, the process 300 chooses the cluster whose function has the greatest relative maximum value of all the functions defined at the eighth Block 623d). Next in FIG. 6, at the tenth Block 623f, the process 300 creates a fuzzy rule (1) whose antecedent clause is the same as the antecedent clause of each rule in the set of conflicting rules chosen at the sixth Block 623b and (2) whose consequent clause involves the fuzzy region in which an output value that substantially represents the center of the cluster selected at the ninth Block 623e has highest degree of membership. As an example, the average value of the output values in the cluster selected at the ninth Block 623e could substantially represent the center of that cluster. Similarly, the output value at which the function defined at the eighth Block 623d for the cluster selected at the ninth Block 623e attains a relative maximum value could also substantially represent the center of that cluster. Next in FIG. 6, at the eleventh Block 623g, the process 300 "removes" each fuzzy rule in the set of conflicting rules picked in the sixth Block 623b. For purposes of the present disclosure, it should be understood that the word "remove" is used broadly and that removing a fuzzy rule encompasses, but is not limited to, deleting the rule from a data structure storing the rules, marking the rule so that it will be subsequently ignored by the process 300 or otherwise changing the status of the rule so that it no longer is considered by the process 300 to be a conflicting rule. Next in FIG. 6, the process 300 returns to the fifth Block 623a.

In FIG. 6, if at the fifth Block 623a the process 300 determines there are no conflicting rules, then the process 300 next, at a twelfth Block 424, produces a model of the time series' behavior. Next in FIG. 6, at a thirteenth Block 330, the process 300 makes the model extracted in the twelfth Block 424 accessible. FIG. 6 shows that next, at a fourteenth Block 340, the process 300 includes using the model extracted in the twelfth Block 424 and made accessible in the thirteenth Block 330 to analyze the time series.

FIG. 7A illustrates extraction of various time-related components from the original time series data and incorporation of these time-related components into the training data, both of which can be performed by the workstation 101 of FIG. 1 or as part of the first Block 310 in FIGS. 3-6, the second Block 510a in FIG. 5 and the second Block 610a in FIG. 6. Time-series data can be stored as a function $f(t)$ of the integers where $t=n$ corresponds to a known time for any integer n. For example, a time series that represents measurements of CPU utilization taken at five-minute intervals beginning at 7:00 A.M. could be encoded as a function $f(t)$ of the nonnegative integers where $f(0)$ is the value of the measurement taken at 7:00 A.M. and $f(n)$ is the value of the measurement taken 5n minutes after 7:00 A.M., for each positive integer n associated with a measurement. In the context of this example, if the original time series is stored as data points of the form $(n; f(n))$ and if it were desirable to extract the time-related component time_of_day from the original time series, then some embodiments might incorporate this time-related component into the training data by transforming the original data point $(n; f(n))$ into $(x(n); f(n))$, where $x(n)$ is the time 5n minutes after 7:00 A.M.

FIG. 7A is a schematic of an embodiment of this process. Original time-series data 701 is input into an Operational Block 710. Various time-related information 702 is also input into the Operational Block 710. The Operational Block 710 uses these inputs to output training data that incorporates one or more time-related components into the original time-series data 701.

Figure 7B:
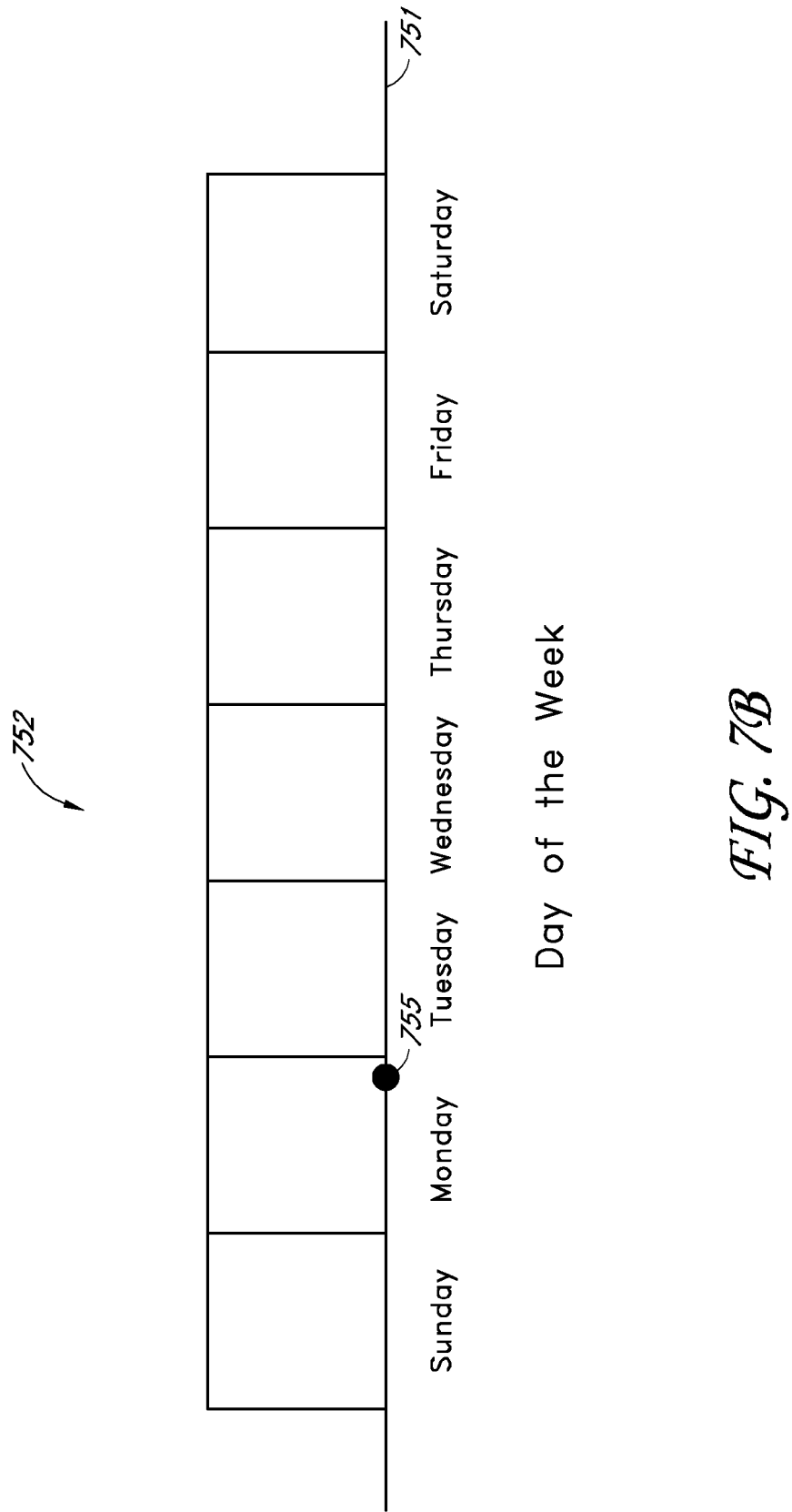
FIG. 7B illustrates the use of rectangular membership functions in connection with time-related components of the training data.

FIG. 7B illustrates the use of rectangular membership functions in connection with a time-related component of the training data. In some situations, it is desirable to make crisp determinations of membership for one or more components of the time-series data rather than tolerate non-trivially fuzzy membership for all components. Time-related components are an example of component spaces that lend themselves to both non-trivially fuzzy and crisp membership determinations. For instance, even though a component corresponding to the day of the week could be made non-trivially fuzzy (e.g., a component value of "11:59 P.M. on Monday" could reasonably fall under a non-trivially fuzzy region "Monday" as well as a non-trivially fuzzy region "Tuesday"), there are situations in which it is more desirable not to permit any overlap between data points whose day-of-the-week components do not match. For example, if the format of the component value were simply the day of the week (e.g., "Monday" instead of day-plus-time as in "11:59 P.M. on Monday"), then crisp membership determinations would be preferable in most cases. In such situations, as illustrated in FIG. 7B, rectangular membership functions can be used. In FIG. 7B, a horizontal axis 751 represents a component space corresponding to the day of the week. FIG. 7B also depicts a series of rectangular regions 752 that demonstrate the division of the component space into non-overlapping (i.e., crisp) fuzzy regions according to the seven days of the week. A darkened point 755 represents a component value corresponding to Monday. As the rectangular regions 752 help depict, the darkened point 755 belongs only to the fuzzy region "Monday." Various embodiments can use such non-overlapping (i.e., crisp) rectangular membership functions for one or more components while still using overlapping (i.e., non-trivially fuzzy) membership functions for other components.

Taken together, FIGS. 8-11 illustrate an embodiment of a process for resolving conflicts between fuzzy rules that is usable with the system of FIG. 1 or with the processes of FIGS. 3-6. Thus, FIGS. 8-11 also illustrate further details of what the second Block 320 of FIG. 3 can include in various embodiments including the embodiment depicted in FIG. 3; of what the fourth Block 423 of FIG. 4 can include in various embodiments including the embodiment depicted in FIG. 4; of what the fifth through seventh Blocks 523-525 of FIG. 5 can include in various embodiments including the embodiment depicted in FIG. 5; and of what the seventh through eleventh Blocks 623c-623g of FIG. 6 can include in various embodiments including the embodiment depicted in FIG. 6.

Figure 8:
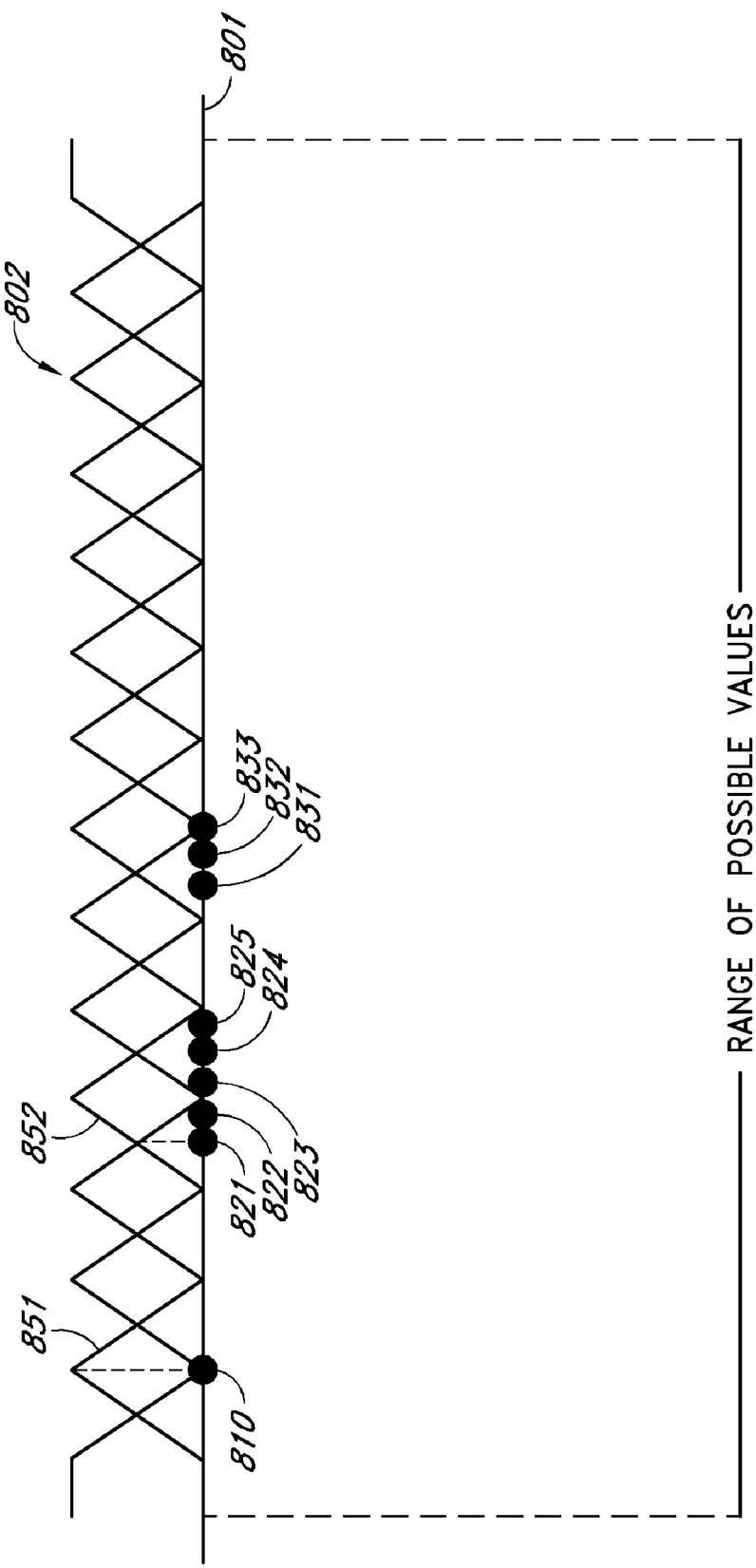
FIG. 8 illustrates the output components of conflicting data points.

FIG. 8 illustrates the output components of conflicting training data points. In FIG. 8, a horizontal axis 801 represents an output component space that includes a range of possible values for a time series with a single output component (i.e., a time series whose output space is one-dimensional). Also depicted in FIG. 8 is a series of triangular regions 802. These triangular regions 802 depict the division of the range of possible values of the output component into fuzzy regions and the assignment of a triangular membership function to each such fuzzy region. For the sake of clarity and brevity, the following discussion of FIGS. 8-11 will refer to a fuzzy region in the figures by its corresponding triangular shape in the figures. Triangular membership functions are used in FIG. 8 by way of example only and one of ordinary skill in the art will appreciate that the process of resolving conflicts between fuzzy rules disclosed herein can be used with any kind of membership function appropriate for fuzzy learning purposes (e.g., semicircular membership functions).

FIG. 8 also features the output components of nine training data points leading to conflicting fuzzy rules, which, as discussed above, means that the antecedent clauses of the fuzzy rules generated by these data points must be identical. More specifically, the output components of these training data points are represented graphically by nine darkened points: a first darkened point 810, second through sixth darkened points 821-825 and seventh through ninth darkened points 831-833. As illustrated in FIG. 8, each of the output components represented by these nine darkened points 810, 821-825 and 831-833 has highest degree of membership in a fuzzy region different from at least one of the fuzzy regions in which the other eight output components individually have highest degree of membership. Since it is assumed that the antecedent clauses of the fuzzy rules associated with these points are identical, the fuzzy rule generated by each of these data points will conflict with at least one other fuzzy rule among the rules generated by the other eight data points. For example, the output component represented by the first darkened point 810 has highest degree of membership in a fuzzy region 851, while the output component represented by the second darkened point 821 has highest degree of membership in a different fuzzy region 852. As a result, the training data point with the output component represented by the first darkened point 810 will generate a rule conflicting with that generated by the training data point with the output component represented by the second darkened point 821.

Figure 9:
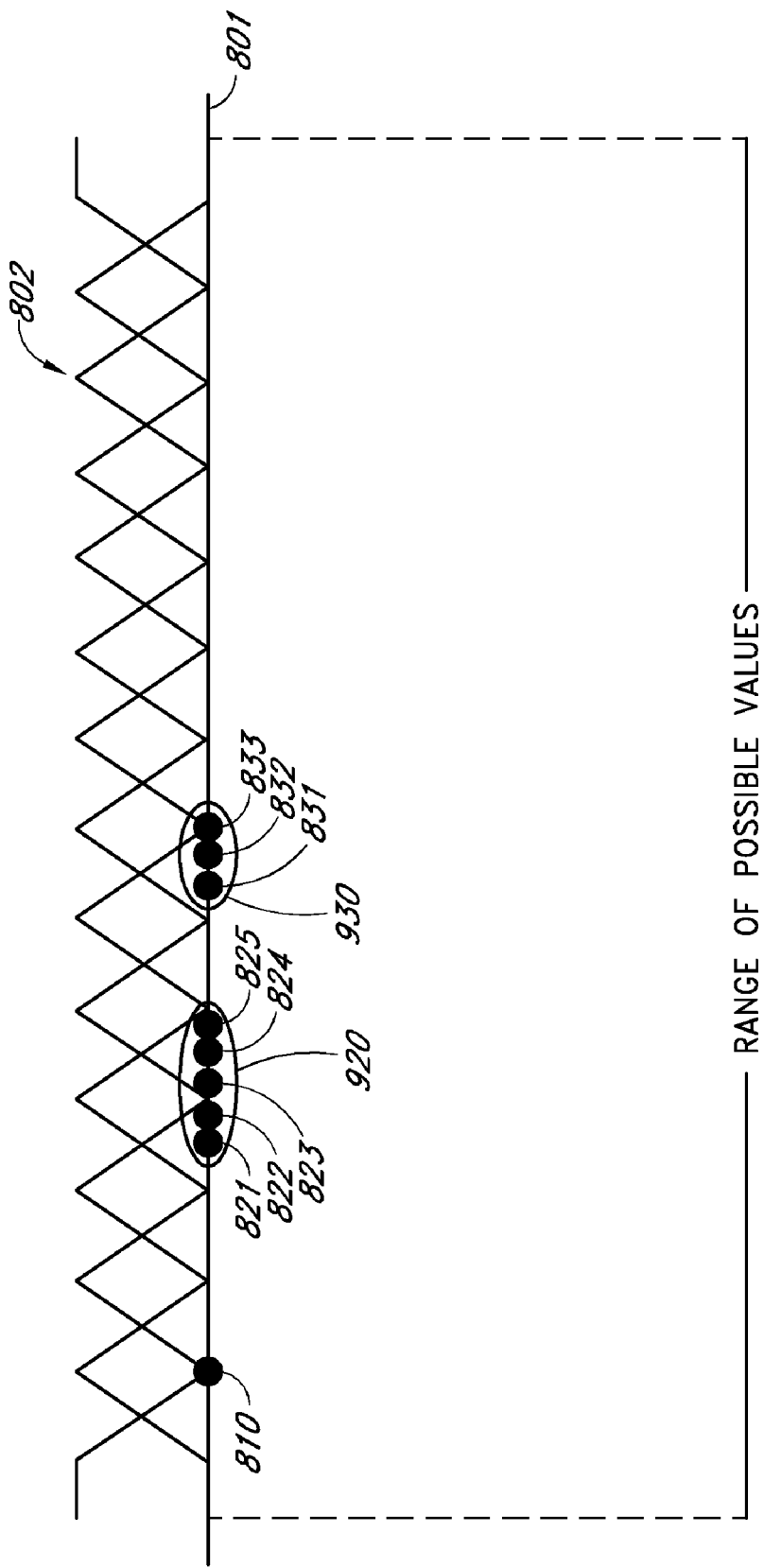
FIG. 9 illustrates a possible clustering of the output components of FIG. 8.
Figure 10:
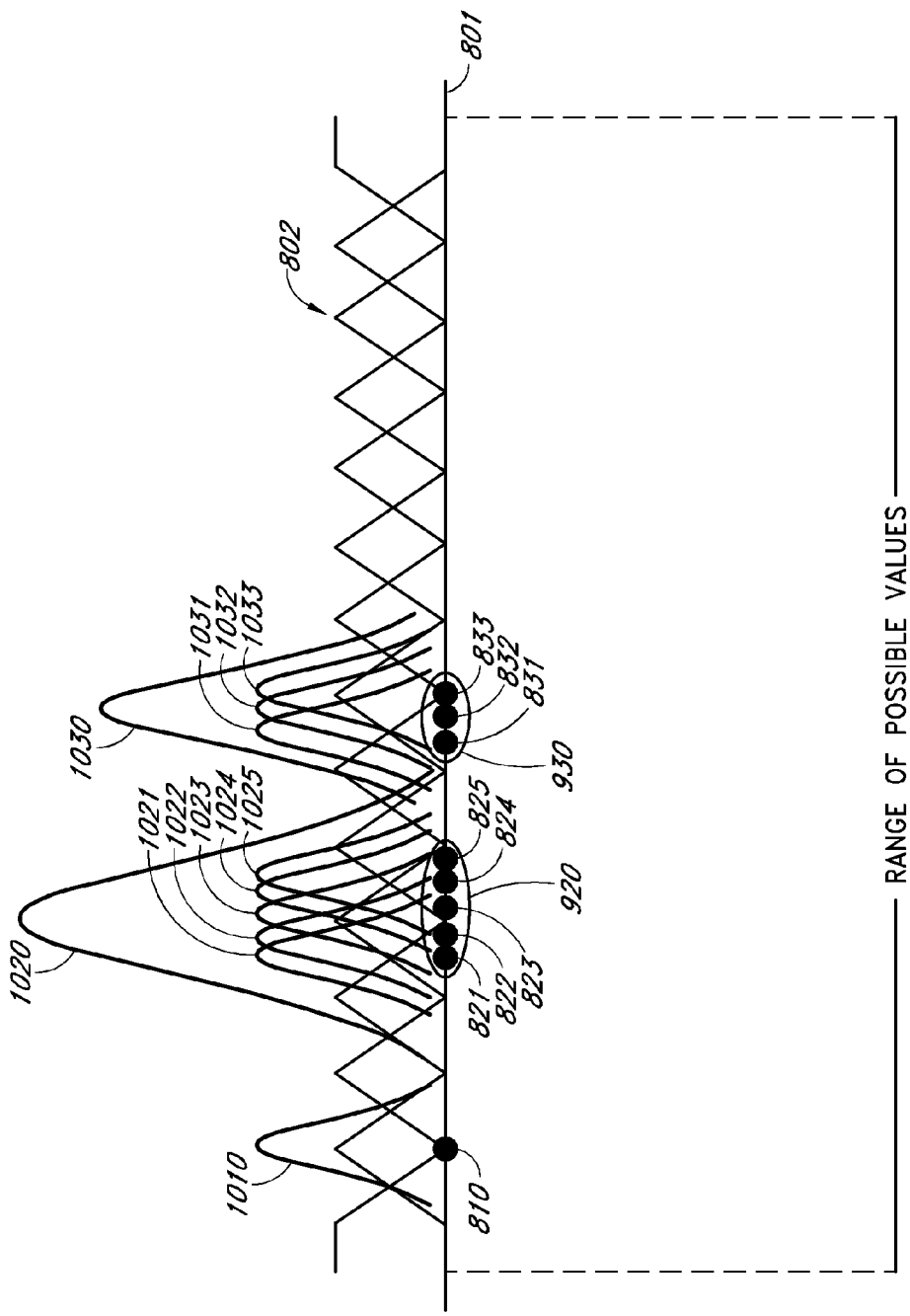
FIG. 10 illustrates functions determined in part by the clustering depicted in FIG. 9.
Figure 11:
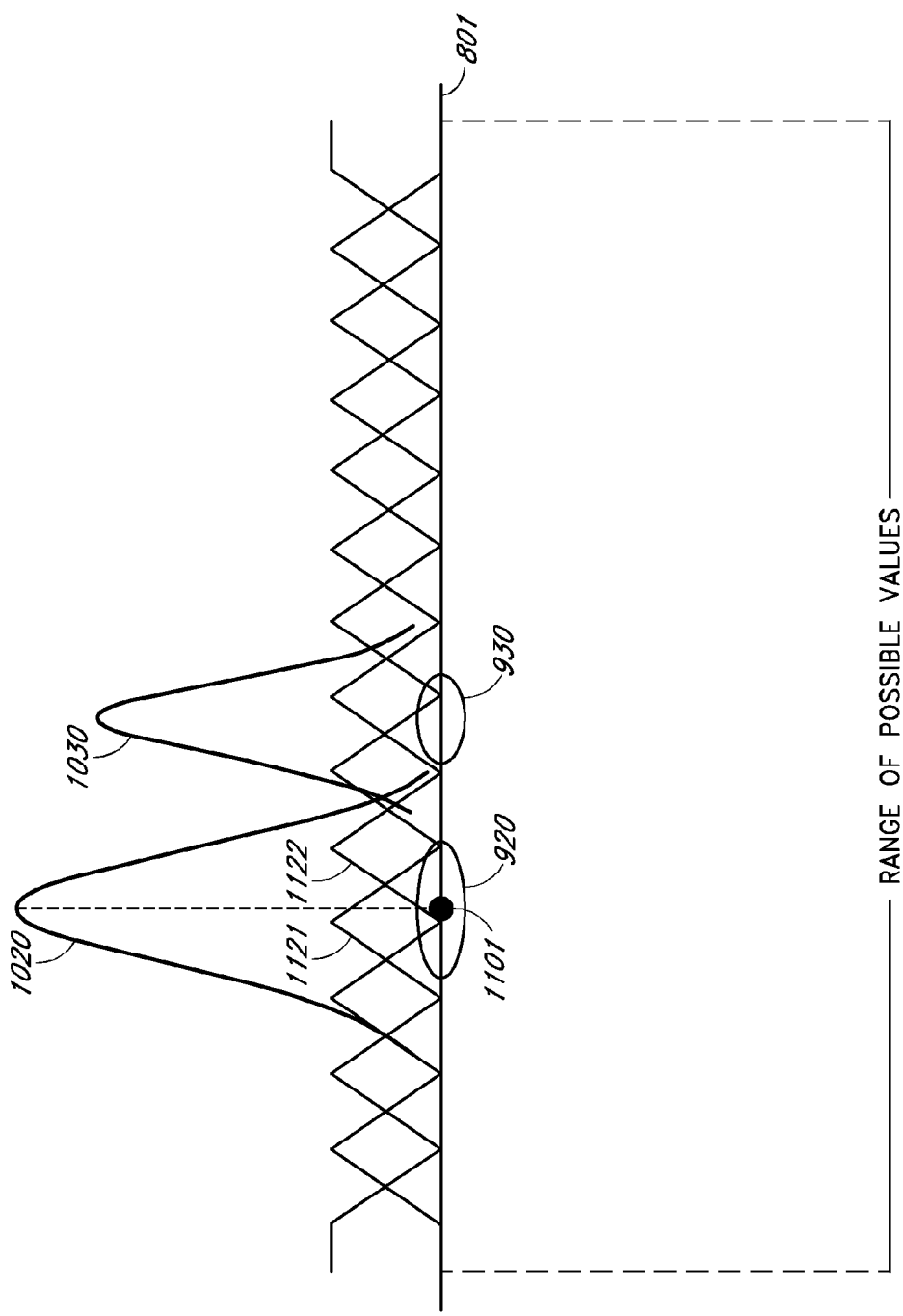
FIG. 11 illustrates selection of an output value substantially representing the center of one of the clusters depicted in FIG. 9.

One category of methods of resolving such conflicts between fuzzy rules is to make use of the way the conflicting data points are clustered. FIGS. 9-11, which make reference to FIG. 8, illustrate a method of resolving conflicts between fuzzy rules that makes use of the way the conflicting data points are clustered. FIG. 9 depicts a clustering of the output components of the conflicting data points of FIG. 8. In some embodiments, this clustering can be produced by applying a clustering algorithm to the output components of the data points. FIG. 9 shows two clusters: a first cluster 920, which includes the output components represented by the second through sixth darkened points 821-825 as numbered in FIG. 8, and a second cluster 930, which includes the output components represented by the seventh through ninth darkened points 831-833 as numbered in FIG. 8. The output component represented by the first darkened point 810 is isolated in the sense that it does not belong to a cluster. In some embodiments, therefore, the output component represented by the first darkened point 810 can be treated like noise. Many different kinds of clustering algorithms can be used in the method of resolving conflicts between fuzzy rules illustrated by FIGS. 9-11. FIG. 9 depicts one possible clustering of the output components of the data points; such a clustering might be returned by an algorithm that requires a threshold number of points to form a cluster. There are many such clustering algorithms. Among these, "Density Based Spatial Clustering of Applications with Noise" (DBSCAN) algorithms are advantageously used, as shown in Ester et al., "A Density-Based Algorithm for Discovering Clusters," *Proceedings of the Second International Conference on Knowledge Discovery and Data Mining*, Portland, Oreg., 1996, AAAI Press, 1996, hereby incorporated by reference in its entirety.

FIG. 10 illustrates another part of a method of resolving conflicts between fuzzy rules. More specifically, FIG. 10, when combined with FIG. 11, illustrates a way of producing a single rule to represent the conflicting rules. In a first step, functions ("first-step functions") are defined for the output components of each conflicting data point. In a second step, aggregate functions are defined for a given cluster based on the first-step functions associated with the output components belonging to the cluster.

As FIG. 10 shows, a first first-step function 1010, second through sixth first-step functions 1021-1025 and seventh through ninth first-step functions 1031-1033 are defined based on the output component values represented by the first darkened point 810, second through sixth darkened points 821-825 and seventh through ninth darkened points 831-833, respectively. As shown in FIG. 10, in some embodiments, these first-step functions differ only in the position of the center of their peaks. In various embodiments, these first-step functions are Gaussian functions; and in some of these various embodiments the following formula can be used to define a Gaussian function $f(x)$ for each conflicting data point:

$$f(x) = e^{\frac{-(x-c)^2}{2\sigma^2}},$$

where c is the value of the data point's output component and σ is some value that remains constant for all data points within a given set of conflicting data points (so that the Gaussian functions only differ in the position of the center of their peaks, which is determined by c). Other embodiments define first-step functions by associating conflicting data points with functions other than Gaussian functions, such as functions that are parabolic in shape.

An aggregate function is defined for each cluster. As illustrated in FIG. 10, a first aggregate function 1020 is defined for the first cluster 920 and a second aggregate function 1030 is defined for the second cluster 930. In some embodiments, the aggregate function for each cluster is defined as the sum of some or all first-step functions associated with an output component in the cluster. That is, if there are n data points, $p_1, \ldots, p_n$, whose output components belong to a cluster C, then, in some embodiments, the aggregate function F(x) for C can be defined as $$F(x) = \sum_{k=1}^{n} f_k(x),$$

where $f_k(x)$ is the first-step function associated with the output component of data point $p_k$, for each integer k such that $1 \leq k \leq n$. Other embodiments define the aggregate function associated with a cluster to be a Gaussian function whose shape is determined by various properties of the cluster such as the density of the cluster or the number of points in the cluster. Still other embodiments define the aggregate functions in ways different than those already discussed.

In some embodiments, the aggregate function with the highest peak (i.e., greatest relative maximum value) among all aggregate functions is selected. In FIG. 11, the first aggregate function 1020 has the highest peak. Next, in some embodiments, an output value along the horizontal axis 801 at which the selected aggregate function reaches a relative maximum value is determined. For the sake of convenience, this value will be referred to as the "selected output value" in this disclosure. In FIG. 11, the selected output value is represented by a darkened point 1101. In some embodiments, the fuzzy region in which the selected output value has the highest degree of membership is determined. For the sake of convenience, this fuzzy region will be referred to as the "selected fuzzy region" in this disclosure. In FIG. 11, although the selected output value represented by the darkened point 1101 is a member of both a first fuzzy region 1121 and a second fuzzy region 1122, it has highest degree of membership in the first fuzzy region 1121. As a result, for purposes of the embodiment shown in FIG. 11, the selected fuzzy region is the first fuzzy region 1121.

In some embodiments, the selected fuzzy region determines a fuzzy rule that represents or otherwise takes the place of all the fuzzy rules in a particular set of conflicting rules. In some embodiments, this representative fuzzy rule is defined by (1) the input components of the data points giving rise to the conflicting fuzzy rules and (2) the selected fuzzy region. As an example, assume for the purposes of this paragraph only that the data points whose output components are depicted in FIGS. 8-10 have two input components, one corresponding to the day of the week and the other corresponding to the hour of the day. Since it was assumed that these data points lead to conflicting fuzzy rules, and thus lead to rules with identical antecedent clauses, further assume that these antecedent clauses are both:

IF the day is "Monday" AND the time is "9:00 A.M.".

Further suppose that the output component of the time series measures CPU utilization, so that in FIGS. 8-11 the horizontal axis 801 represents a range of values indicating how intensely a CPU is utilized. If, in FIG. 11, the selected fuzzy region 1121 corresponds to a fuzzy value of "medium" CPU utilization, then, according to the embodiments described in this paragraph, the representative fuzzy rule determined by the selected fuzzy region might be:

IF the day is "Monday" AND the time is "9:00 A.M." THEN CPU utilization is "medium".

To summarize, FIGS. 8-11 together illustrate a method of resolving conflicts between fuzzy rules that makes use of the way the conflicting data points are clustered. In embodiments using this method, to resolve a given set of conflicting rules, the output components of the data points giving rise to the rules in the set of conflicting rules are clustered. For each conflicting data point, a first-step function is defined by the value of the data point's output component. In some embodiments, the first-step functions are Gaussian functions. For each cluster of output components, an aggregate function is defined in some way, such as by summing all first-step functions associated with the cluster. The aggregate function with greatest relative maximum value is selected and an output value associated with a relative maximum of the selected aggregate function is determined. The fuzzy region for which this output value has the highest degree of membership is used to determine the consequent clause of a rule that is used instead of any of the conflicting fuzzy rules.

It should be understood that the conflict-resolution methods disclosed herein can be generalized for use with time series having multiple input components and multiple output components. That is, although FIGS. 8-11 show a single output component (i.e., a one-dimensional output space), the methods discussed herein are easily generalized to multiple output components (i.e., multi-dimensional output spaces).

Moreover, it should be understood that some embodiments use a method of resolving conflicts between fuzzy rules that differs from that illustrated in FIGS. 8-11 and discussed above. Some embodiments use methods that could be considered variations of the conflict-resolution method illustrated in FIGS. 8-11. For example, some embodiments define first-step functions for each conflicting point before performing the clustering operation. As another example, some embodiments use Gaussian functions for the first-step functions but use a different formula to define the Gaussian functions than the formula provided above. Other embodiments use conflict-resolution methods that differ more significantly from the conflict-resolution method illustrated in FIGS. 8-11. For instance, various embodiments do not perform both steps that are illustrated in FIG. 10. That is, some of these various embodiments define an aggregate function for each cluster without defining first-step functions, whereas other embodiments only define functions for each conflicting data point (i.e., first-step functions) without defining aggregate functions. For example, some embodiments that only define aggregate functions, without defining first-step functions, define the aggregate function for a given cluster to be a Gaussian function whose properties (such as peak-height or full width at half maximum) are determined by properties of the cluster (such as the density of the cluster or the number of points in the cluster). As another example of ways in which embodiments can use conflict-resolution methods that differ more significantly from the conflict-resolution method illustrated in FIGS. 8-11, some embodiments not only give weight to the cluster whose aggregate function has the greatest maximum value but also give weight to other clusters. As yet another example, some embodiments do not rely on output component values corresponding to the maximum values of aggregate functions but instead focus on some other value representative of the clustered output components, such as their average or their weighted average where a component's weight is determined by criteria such as the density of a neighborhood of the component. As still another example, some embodiments take a one pass approach that builds up aggregate functions for various sets of conflicting data points as clustering occurs. Some such embodiments use a DBSCAN algorithm that is based on sums Gaussian functions that are defined according to how conflicting data points are clustered, where the sums are updated as each time-series data point is processed. These and other embodiments taking a one pass approach are discussed below in connection with FIGS. 13-17. As still another example of ways in which embodiments can use conflict-resolution methods that differ more significantly from the conflict-resolution method illustrated in FIGS. 8-11, some embodiments do not completely resolve all conflicts between rules; that is, some embodiments tolerate some conflict among the fuzzy rules that are ultimately used in the defuzzification process to extract a model of the time-series behavior.

In some situations, it is desirable to extract time-series behavior that reflects, to some degree, relationships between data points. For example, in the context of an RDBMS, it may be desirable to investigate the relationship, if any, between CPU utilization at one hour on a workday and CPU utilization during the next hour. To that end, time-series data representing measurements of CPU utilization taken at hourly intervals beginning at, for example, 5:00 A.M. can be encoded as a function $f_1(t)$ of the nonnegative integers where $f_1(0)$ is the value of the measurement taken at 5:00 A.M. and $f_1(n)$ is the value of the measurement taken n hours after 5:00 A.M., for each positive integer n associated with a measurement. This process can be repeated for m days, producing m functions $f_1(t), \ldots, f_m(t)$. To extract some aspects of the relationship(s) between CPU utilization from one hour to the next, some embodiments would load the time-series data in the form $(f_k(n); f(n+1))$, for integers k such that $1 \leq k \leq m$, so that CPU utilization at time n (i.e., when t=n) is an input component corresponding to an output component representing CPU utilization at time n+1.

Figure 12:
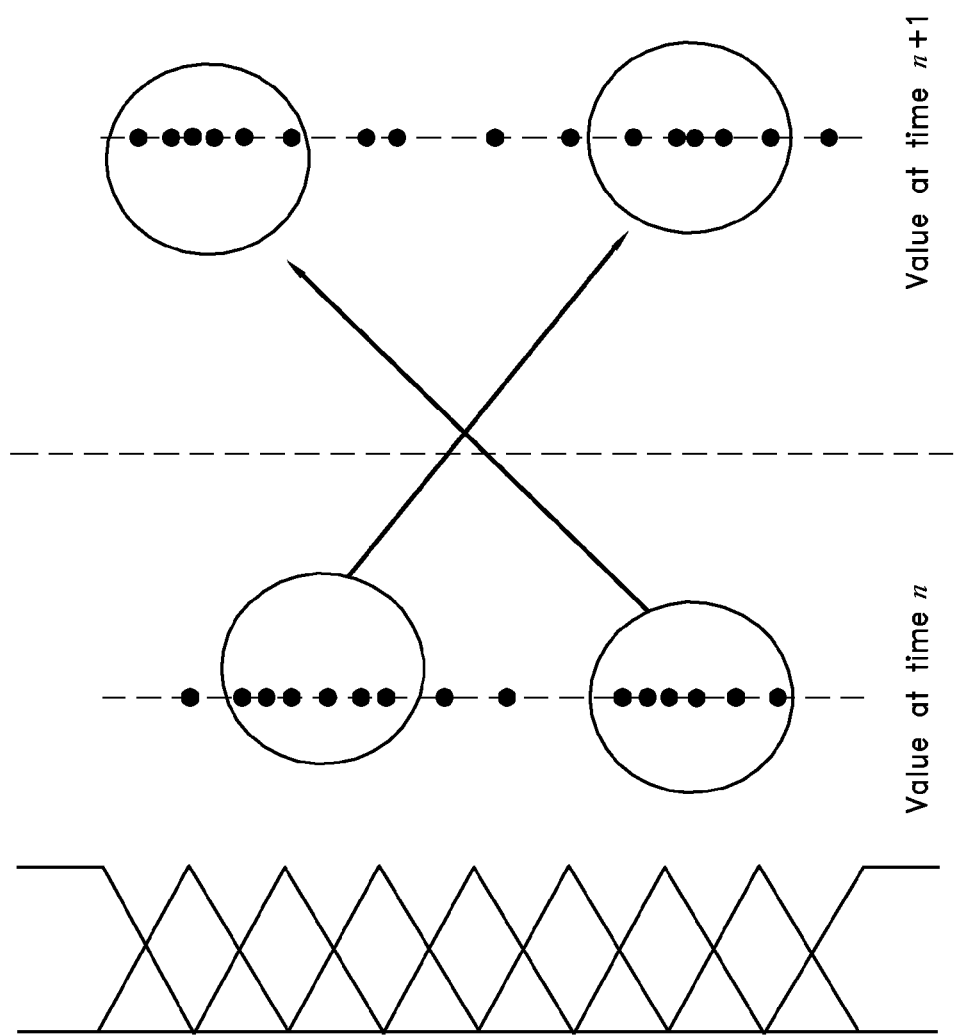
FIG. 12 shows relationships between input components of time-series data points that some embodiments can extract.

FIG. 12 illustrates some relationships that such an embodiment might extract from such time-series data. In FIG. 12, the darkened points on the left side of the diagram (i.e., to the left of a central dashed line) represent values such as CPU utilization measured at time n (i.e., values $f_k(n)$ for integers k such that $1 \leq k \leq m$). The darkened points on the right side of the diagram represent values such as CPU utilization measured at time n+1. The arrows indicate that there is some relationship between the values at time n and the values at time n+1. For example, if the measured values represent CPU utilization in FIG. 12, then various embodiments can extract models suggesting that if CPU utilization is low at time n then it will be high at time n+1, and if it is high at time n then it will be low at time n+1. Although in FIG. 12 the input and output component spaces are divided into the same fuzzy regions, in general, as discussed above, the input and output component spaces do not need to be divided into fuzzy regions in the same way. Moreover, the data need not be loaded in exactly the manner described in this paragraph. In some embodiments, there are additional input or output components. For example, a plurality of prior values can be used as input components: that is, a data point at time n can be of the form $(f(n-k), \ldots, f(n-1); f(n))$ for some positive integer k. Furthermore, there can be one or more time-related input components such as a value representing the time of the day. Similarly, there can be multiple output components as well.

In many situations, after using certain data to extract a model of a time series it is desirable to update the model based on additional data. In some embodiments, this can be accomplished efficiently because modification of the model based on the additional data does not require revisiting the data used to produce the original model. That is, some embodiments take a "one pass" approach to processing the training data.

Figure 13:
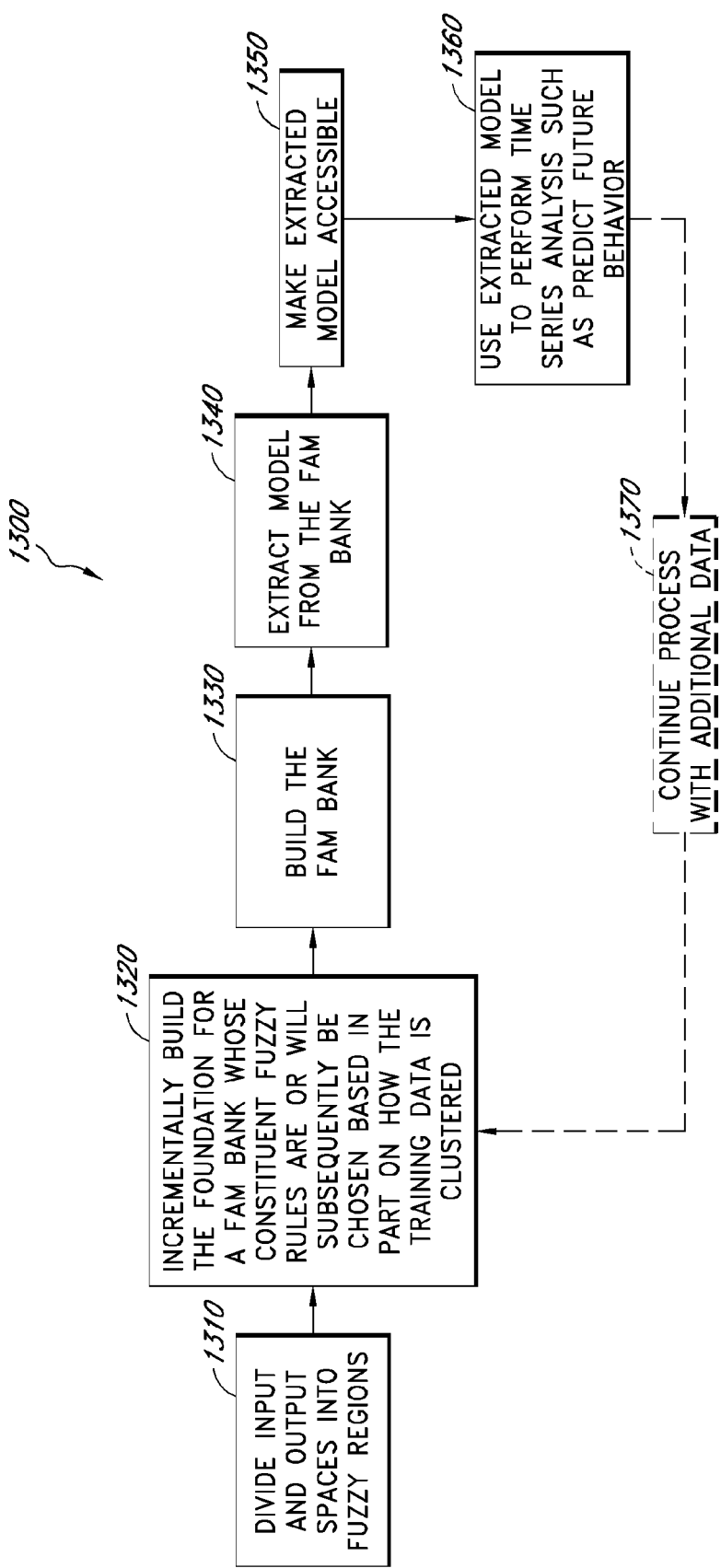
FIG. 13 is a flowchart of an embodiment of a one pass, incremental process for extracting time-series behavior where fuzzy learning is used and is based in part on how the time-series data is clustered.

FIG. 13 is a flowchart of an embodiment of a one pass extraction process 1300 performable, for example, by the system 100 of FIG. 1. In FIG. 13, beginning at a first Block 1310, the process 1300 divides the input and output spaces into fuzzy regions. Next, at a second Block 1320, the process 1300 incrementally builds the foundation for a FAM bank. That is, at the second Block 1320, the process 1300 loads a certain amount of training data and, based on this training data, generates information or criteria that will aid the construction of a FAM bank. The process 1300 builds this foundation "incrementally" in the sense that even after it has produced a model of the time series, it can later update the model relatively quickly by loading another increment of data, updating the foundation without performing further calculations on previous increments of data, and extracting a model from the updated foundation. Moreover, the foundation that the process 1300 builds at the second Block 1320 gives rise to a FAM bank whose constituent rules are chosen based in part on how the training data loaded at the second Block 1320 is clustered.

Next, at a third Block 1330, the process 1300 of FIG. 13 builds a FAM bank based on the foundation constructed in the second Block 1320. At a fourth Block 1340, the process 1300 next extracts a model of the time series from the FAM bank. As discussed above, in some embodiments the model extracted is itself a FAM bank. Thus, in some embodiments, the process 1300 achieves the objective of the fourth Block 1340 at the third Block 1330, so that the fourth Block 1340 is in essence removed. Next in FIG. 13, at a fifth Block 1350, the process 1300 makes the model extracted in the fourth Block 1340 accessible. FIG. 13 shows that next, at a sixth Block 1360, the process 1300 includes using the model extracted in the fourth Block 1340 and made accessible in the fifth Block 1350 to analyze the time series. At a seventh Block 1370, the process 1300 can retrieve or be notified of additional data, at which point it can return to the second Block 1421 to continue the process and thereby update the model extracted from the previous increment(s) of data.

Figure 14:
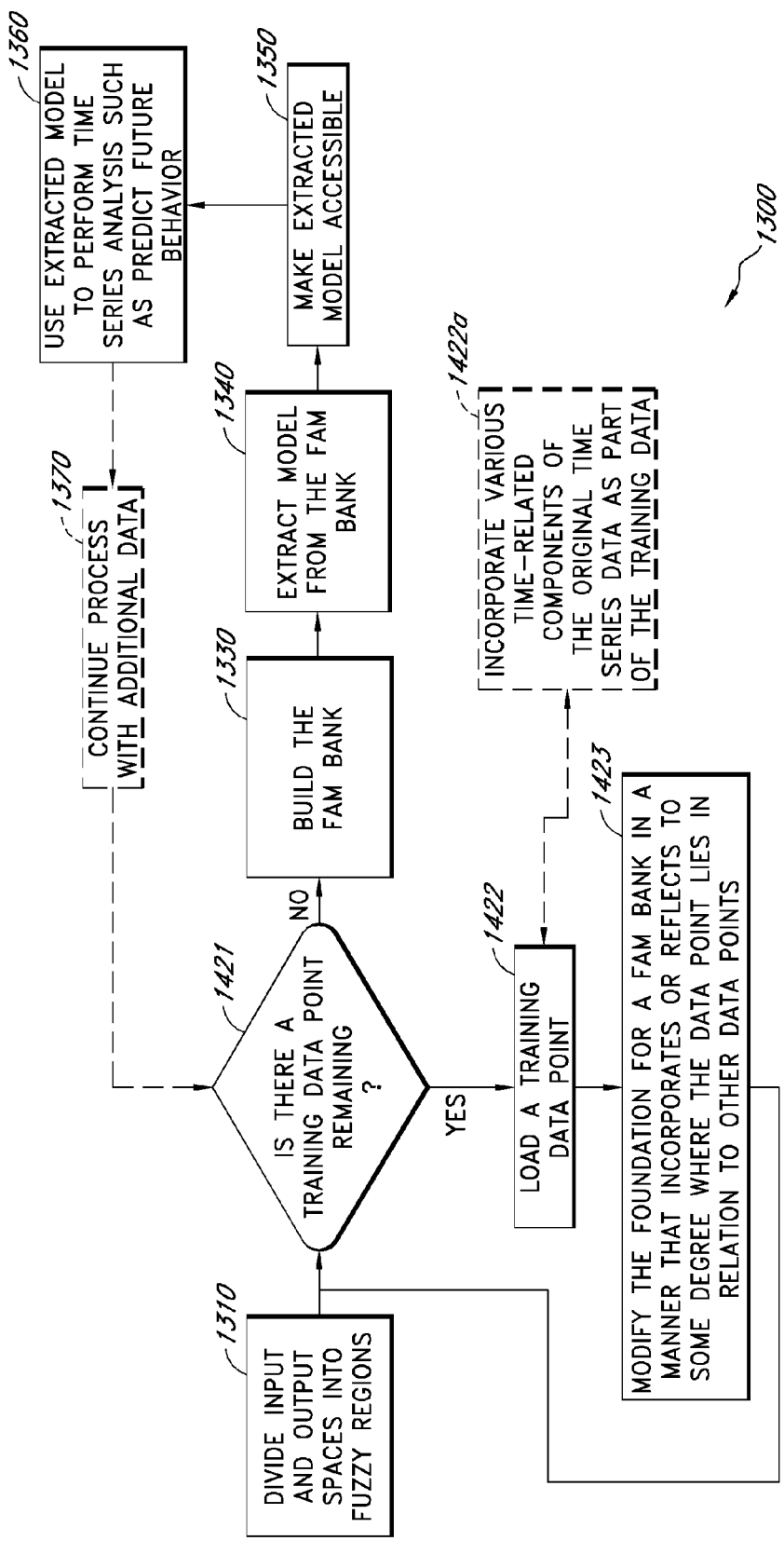
FIG. 14 is a flowchart of an embodiment of a one pass, incremental process for extracting time-series behavior where the foundation for a Fuzzy Associated Memory (FAM) bank is constructed in a way that reflects the way the training data is clustered.

FIG. 14 illustrates further details of one embodiment. In particular, second through fifth Blocks 1421, 1422, 1422a and 1423 illustrate further details of what the second Block 1320 of FIG. 13 can include in various embodiments including the embodiment depicted in FIG. 13. Beginning at a first Block 1310, the process 1300 divides the input and output spaces into fuzzy regions. Next, at the second Block 1421, the process 1300 determines whether there is another training data point to load. If so, then at the third Block 1422 the process 1300 loads a training data point. Simultaneously or next, the process 1300 can also perform the operations at the fourth Block 1422a. That is, before or while loading the training data point, the process 1300 can incorporate various time-related components of the original time series data as part of the training data. The discussion of FIG. 7A above discusses some embodiments of the fourth Block 1422a.

Next in FIG. 14, at a fifth Block 1423, the process 1300 builds and/or modifies a foundation for a FAM bank in such a way that incorporates or reflects to some degree where the data point lies in relation to other data points. Some embodiments of the fifth Block 1423 are discussed below in the discussion of FIG. 15. Next, the process 1300 returns to the second Block 1421. If there are no more training points for the process 1300 to consider at this time, next, at a sixth Block 1330, the process 1300 of FIG. 14 builds a FAM bank based on the foundation constructed in the second through fifth Blocks 1421, 1422, 1422a and 1423. At a seventh Block 1340, the process 1300 next extracts a model of the time series from the FAM bank. As discussed above, in some embodiments the model extracted is itself a FAM bank. Thus, in some embodiments, the process 1300 achieves the objective of the seventh Block 1340 at the sixth Block 1330. Next in FIG. 14, at an eighth Block 1350, the process 1300 makes the model extracted in the seventh Block 1340 accessible. FIG. 14 shows that next, at a ninth Block 1360, the process 1300 includes using the model extracted in the seventh Block 1340 and made accessible in the eighth Block 1350 to analyze the time series. At a tenth Block 1370, the process 1300 can retrieve or be notified of additional data, at which point it can return to the second Block 1421 to continue the process and thereby update the model extracted from the previous increment(s) of data.

Figure 15:
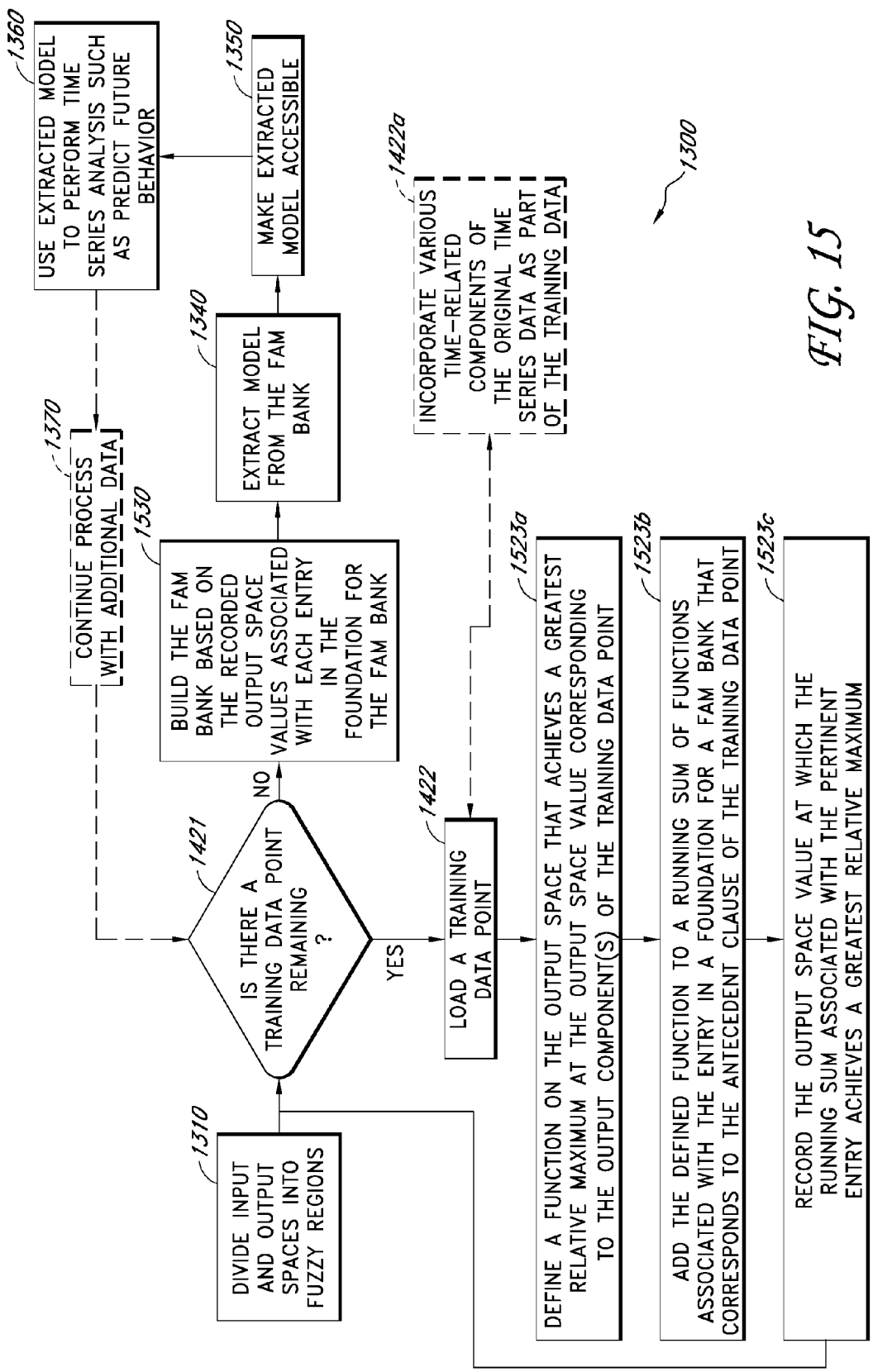
FIG. 15 is a flowchart of an embodiment of a one pass, incremental process for extracting time-series behavior where the foundation for a FAM bank is constructed using sums of functions that achieve greatest relative maxima at points that reflect the output components of the training data.

FIG. 15 illustrates further details of one embodiment. In particular, fifth through seventh Blocks 1523a-1523c illustrate further details of what the fifth Block 1423 of FIG. 14 can include in various embodiments including the embodiment depicted in FIG. 14. Beginning at a first Block 1310, the process 1300 divides the input and output spaces into fuzzy regions. Next, at a second Block 1421, the process 1300 determines whether there is another training data point to load. If so, then at a third Block 1422 the process 1300 loads a training data point. Simultaneously or next, the process 1300 can also perform the operations at a fourth Block 1422a. That is, before or while loading the training data point, the process 1300 can incorporate various time-related components of the original time series data as part of the training data. The discussion of FIG. 7A above discusses some embodiments of the fourth Block 1422a.

Next in FIG. 15, at the fifth Block 1523a the process 1300 defines a function on the output space that attains a greatest relative maximum at the output space value corresponding to the output component(s) of the training data point loaded at the third Block 1422. For example, in various embodiments, at the fifth Block 1523a, the process 1300 defines a Gaussian function based on the output space value corresponding to the output component(s) of the training data point. If the output space is one-dimensional, then in some of these various embodiments the following formula is used to define a Gaussian function $f(x)$ for the training data point loaded at the third Block 1422:

$$f(x) = e^{\frac{-(x-c)^2}{2\sigma^2}},$$

where c is the value of the data point's output component and σ is some value that remains constant for all data points that conflict with the training data point loaded at the third Block 1422 (so that the Gaussian functions only differ in the position of the center of their peaks, which is determined by c). In other embodiments, the process 1300 defines functions other than Gaussian functions, such as functions that are parabolic in shape.

Next in FIG. 15, at the sixth Block 1523b, the process 1300 begins to construct and/or modifies a foundation for a FAM bank. In some embodiments, as is the case for the embodiment depicted in FIG. 15, the foundation for the FAM bank is an association between antecedent clauses of fuzzy rules and, among other things, running sums of functions. That is, for each possible antecedent clause the process 1300 of FIG. 15 keeps track of a running sum of functions. In one embodiment, the sums initially are set to the constant function whose constant value is zero. The process 1300 determines what antecedent clause would be generated by the training data point loaded at the third Block 1422 and adds the function defined at the fifth Block 1523a to the running sum associated with that antecedent clause.

Figure 16:
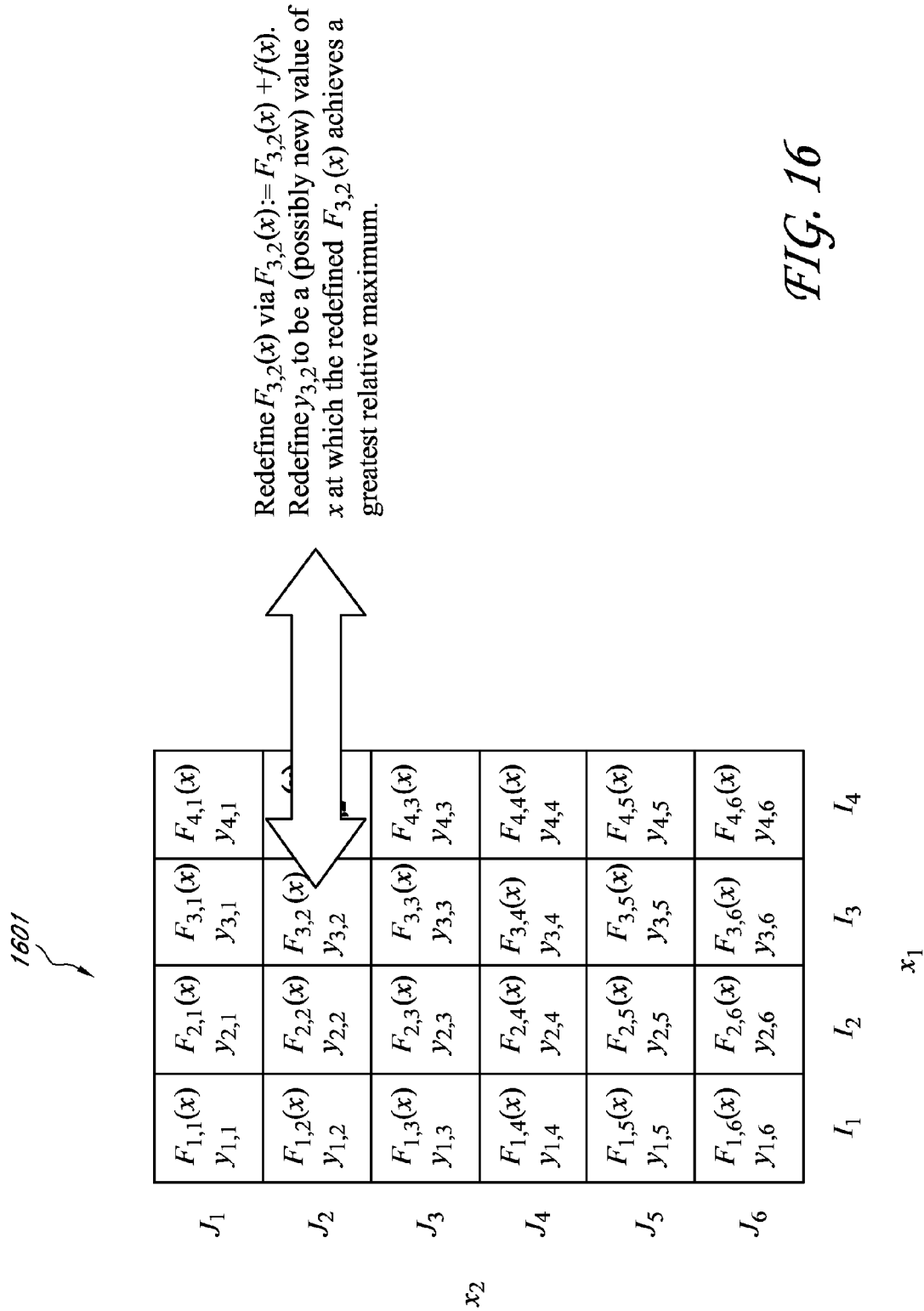
FIG. 16 illustrates the way in which a foundation for a FAM bank is constructed in some embodiments.

FIG. 16 illustrates one way of implementing the operations at the sixth Block 1523b of FIG. 15. In FIG. 16, it is assumed that the training data has two input components, $x_1$ and $x_2$, and one output component, $y_1$. It is further assumed that the component space for $x_1$ has been divided into four fuzzy regions, $I_1, \ldots, I_4$, and that the component space for $x_2$ has been divided into six fuzzy regions, $J_1, \ldots, J_6$. The foundation for the FAM bank is graphically represented by a table 1601 having four columns and six rows that correspond, respectively, to the four fuzzy regions for $x_1$ and the six fuzzy regions for $x_2$. The cell in the ith column and the jth row of the table 1601 contains the running sum of functions, $F_{i,j}(x)$, associated with the antecedent clause "IF $x_1$ is $I_i$ AND $x_2$ is $J_j$". As illustrated in FIG. 16, in some embodiments, if the training data point loaded at the third Block 1422 of FIG. 15 would generate a fuzzy rule with antecedent clause "IF $x_1$ is $I_3$ AND $x_2$ is $J_2$" then, at the sixth Block 1523b of FIG. 15, the process 1300 would redefine $F_{3,2}(x)$ to be equal to its old value plus the function $f(x)$ defined at the fifth Block 1523a. Thus, FIG. 16 depicts the cell in the third column and second row of the table 1601 being updated.

In some embodiments, as is the case for the embodiments depicted in FIG. 15, the foundation for the FAM bank is also an association between antecedent clauses of fuzzy rules and output space values at which the associated running sums of functions achieve greatest relative maxima. Thus, at the seventh Block 1523c in FIG. 15, the process 1300 next determines at what output space value the relevant running sum of functions achieves a greatest relative maximum, where the relevant running sum is the one associated with the antecedent clause generated by the training data point loaded at the third Block 1422. The process 1300 keeps track of this output value and associates it with the antecedent clause generated by the training data point loaded at the third Block 1422. In some embodiments, the process 1300 does not perform the operations of the seventh Block 1523c until right before it builds the FAM bank at an eighth Block 1530. That is, in such embodiments, the process 1300 does not repeatedly update the foundation to reflect the changes in output space values associated with antecedent clauses but instead waits until all running sums have been updated to reflect a particular increment of training data and then determines at what output space values each running sum achieves its own greatest relative maximum.

FIG. 16 also illustrates one way of implementing the operations at the seventh Block 1523c of FIG. 15. The cell in the ith column and the jth row of the table 1601 in FIG. 16 also contains the output space value, $y_{i,j}$, at which $F_{i,j}(x)$, the running sum of functions associated with the antecedent clause "IF $x_1$ is $I_i$ AND $x_2$ is $J_j$", achieves a greatest relative maximum. Thus, the example illustrated in FIG. 16 and discussed above continues as follows: in some embodiments, once $F_{3,2}(x)$ is updated, the process 1300, at the seventh Block 1523c of FIG. 15, redefines $y_{3,2}$ to be a value of x at which $F_{3,2}(x)$ achieves a greatest relative maximum, as shown in FIG. 16. Thus, FIG. 16 depicts the cell in the third column and second row of the table 1601 being updated.

Next in FIG. 15, the process 1300 returns to the second Block 1421. If there are no more training data points in the current increment of training data, the process 1300 moves next to the eighth Block 1530, at which it builds the FAM bank according to the foundation. In some embodiments, the process 1300 constructs the FAM bank as follows: for each antecedent clause "IF $x_1$ is $R_1$ [operator] ... [operator] $x_n$ is $R_n$" (where $R_1, \ldots, R_n$ are fuzzy regions), if, according to the foundation, the output space value associated with that antecedent clause is $(b_1, \ldots b_m)$, then the process 1300 will add the following rule to the FAM bank:

IF $x_1$ is $R_1$ [operator] ... [operator] $x_n$ is $R_n$
THEN $y_1$ is $R(b_1)$ [operator] ... [operator] $y_m$ is $R(b_m)$, where R(c) denotes the fuzzy region (or label associated with the fuzzy region) for which the output space component value c has the highest degree of membership. For example, if the antecedent clause were "IF the day is 'Monday' AND the time is '9:00 A.M.'" and the output space value associated with that antecedent clause were "95 percent" then, in some embodiments, the process 1300 of FIG. 15 would add the following rule to the FAM bank:

IF the day is "Monday" AND the time is "9:00 A.M."
THEN CPU utilization is "high", assuming that "high" is the fuzzy region in which the output space value "95 percent" has the highest degree of membership.

Figure 17:
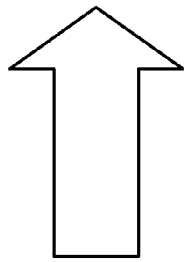
FIG. 17 illustrates the way in which a FAM bank is constructed from a foundation for a FAM bank in some embodiments.

FIG. 17 illustrates how some embodiments of the process 1300 of FIG. 15 would construct the FAM bank at the eighth Block 1530 of FIG. 15 using the foundation illustrated in FIG. 16. On the left hand side, FIG. 17 features a first table 1601, which is the table from FIG. 16. As illustrated in FIG. 17, the first table 1601 gives rise to a FAM bank represented by a second table 1701 that is the same as the first except that the cell in the ith column and the jth row of the second table 1701 contains the fuzzy region $R(y_{i,j})$, i.e., the fuzzy region (or label associated with the fuzzy region) for which the output space value $y_{i,j}$ has the highest degree of membership. Thus, the rules in the FAM bank represented by the second table 1701 are of the form:

IF $x_1$ is $I_i$ AND $x_2$ is $J_j$ THEN $y_1$ is $R(y_{i,j})$.

The fuzzy rules constituting the FAM bank created by the process 1300 at the eighth Block 1530 of FIG. 15 are chosen at least in part by how the training data is clustered. This result occurs because the relative maxima of a sum of functions that themselves each achieve a relative maximum value inherently reflect to some degree the clustering of the points at which the various summand functions achieve their greatest relative maxima. Accordingly, the embodiments depicted in FIGS. 13-17 illustrate further details of what the second Block 320 of FIG. 3 can include in various embodiments including the embodiment depicted in FIG. 3; and of what the fourth Block 423 of FIG. 4 can include in various embodiments including the embodiment depicted in FIG. 4.

At a ninth Block 1340 in FIG. 15, the process 1300 next extracts a model of the time series from the FAM bank. Next in FIG. 15, at a tenth Block 1350, the process 1300 makes the model extracted in the ninth Block 1340 accessible. FIG. 15 shows that next, at an eleventh Block 1360, the process 1300 includes using the model extracted in the ninth Block 1340 and made accessible in the tenth Block 1350 to analyze the time series. At a twelfth Block 1370, the process 1300 can retrieve or be notified of additional data, at which point it can return to the second Block 1421 to continue the process and thereby update the model extracted from the previous increment(s) of data. To update the model, the process 1300 keeps track of the foundation even after the FAM bank is constructed at the eighth Block 1530. Thus, the process 1300 can easily update the extracted model after the twelfth Block 1370 by simply using the new increment of data to update the output space values and running sums of functions associated with each antecedent clause in the foundation and by then using this updated foundation to extract an updated model. Notably, the process 1300 does not need to reexamine the training data points of previous increments to update the model.

Figure 18:
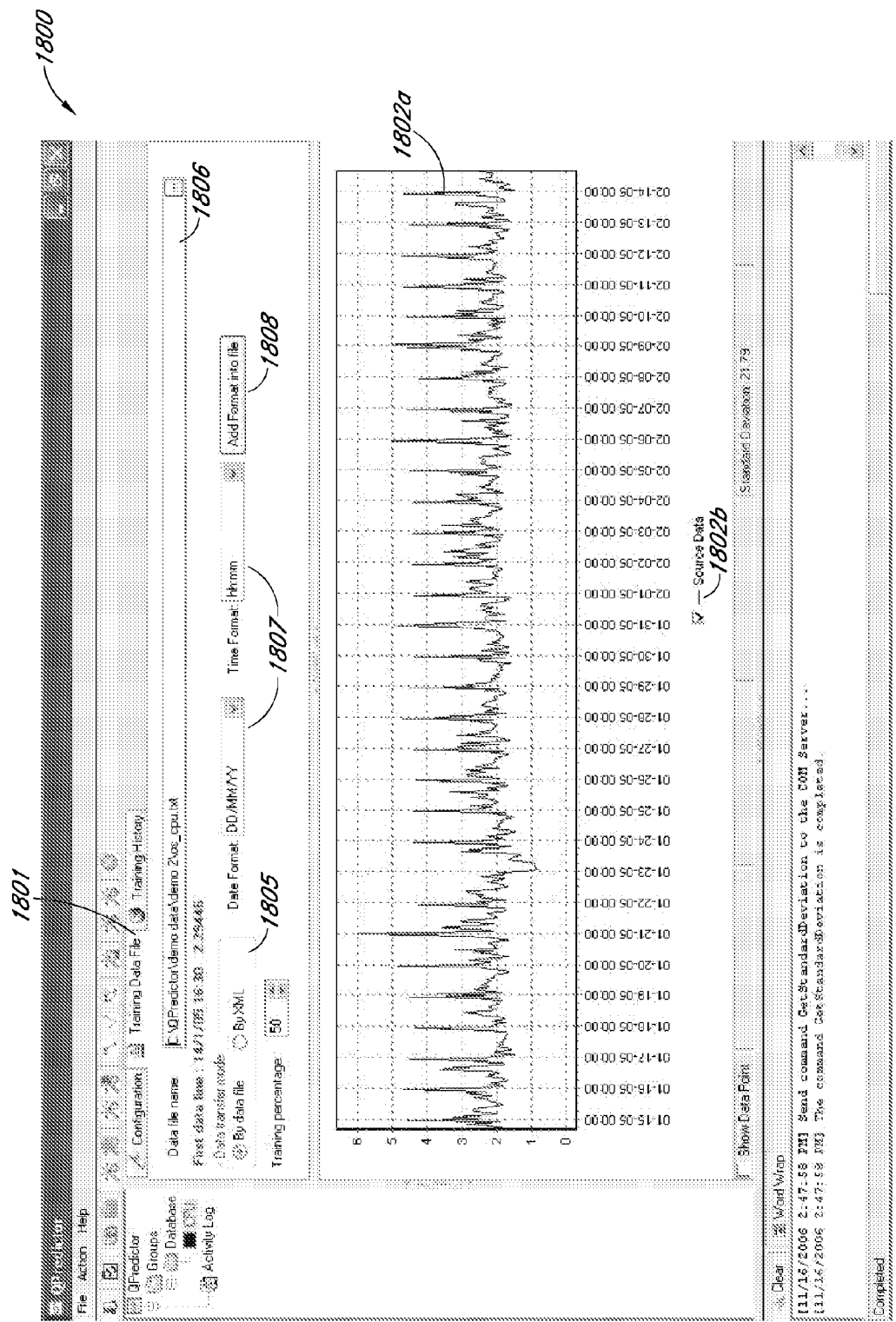
FIG. 18 shows a user interface for extracting time-series behavior wherein the interface provides a view of time-series data.
Figure 19:
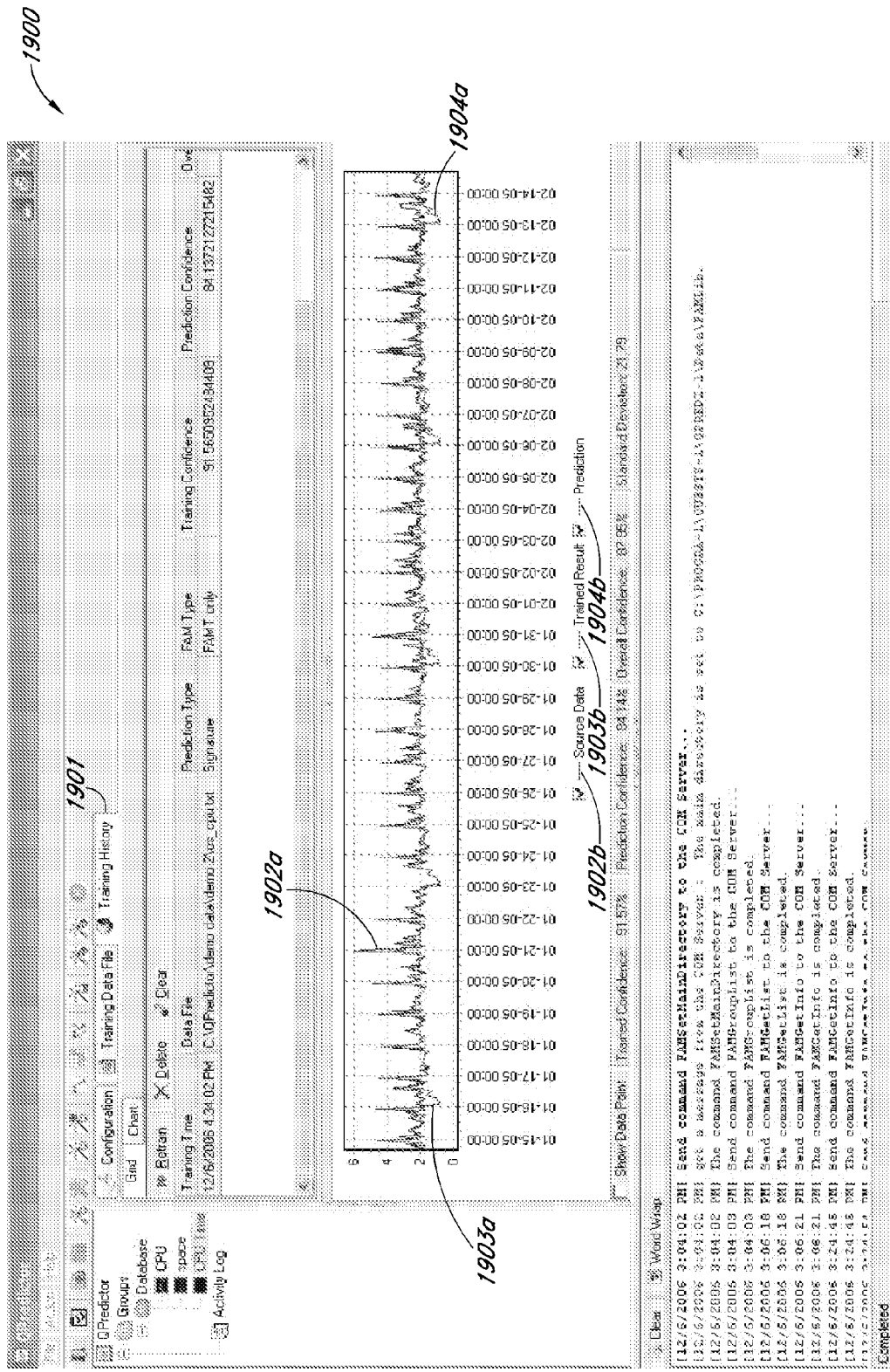
FIG. 19 shows a user interface for extracting time-series behavior wherein the interface provides a view of training data and a model extracted from the training data.

FIGS. 18 and 19 each illustrate an example user interface (1800 and 1900, respectively) for extracting time-series behavior. One or both of the example user interfaces 1800 and 1900, in certain embodiments, can be implemented as the user interface 110 on the workstation 101 of FIG. 1. In one embodiment, the example user interfaces 1800 and 1900 are separate views of a single user interface. In FIG. 18, the example user interface 1800 shows a view of the source data from which the training data can be selected. This view can be selected within the interface by a tab 1801. The view displayed in the example user interface 1800 provides a graphical representation 1802a of the training data. The visibility of the graphical representation 1802a within the display can be toggled by checking and unchecking a checkbox 1802b. An area 1805 provides radio buttons by which a user can select the mode of data loading. When the appropriate button is selected in the area 1805, a field 1806 allows a user to specify an input file from which the training data can be loaded. Drop-down menus 1807 allow the user to specify which time-related components should be analyzed as components of the training data. Thus, in some embodiments, the drop-down menus 1807 can allow a user to control how process 300 behaves at the second Block 510a in FIG. 5 or at the second Block 610a in FIG. 6.

In FIG. 19, the example user interface 1900 shows a view of, among other things, the training data and the extracted model. This view can be selected within the interface by a tab 1901. The view displayed in the example user interface 1900 provides a graphical representation 1902a of the source data from which the training data can be selected. The visibility of the graphical representation 1902a within the display can be toggled by checking and unchecking a checkbox 1902b. Similarly, the view displayed in the example user interface 1900 provides a graphical representation 1903a of the "trained result," i.e., the extracted model as evaluated on the input of the training data, as well as a graphical representation 1904a of a "prediction," i.e., the extracted model as evaluated on the input of the source data that was not used as training data. The visibility of the graphical representation 1903a of the trained result and the graphical representation 1904a of the prediction within the display can be toggled by checking and unchecking checkboxes 1903b and 1904b.

Each of the processes, components, and algorithms described above can be embodied in, and fully automated by, code modules executed by one or more computers or computer processors. The code modules can be stored on any type of computer-readable medium or computer storage device. The processes and algorithms can also be implemented partially or wholly in application-specific circuitry. The results of the disclosed processes and process steps can be stored, persistently or otherwise, in any type of computer storage. In one embodiment, the code modules can advantageously execute on one or more processors. In addition, the code modules can include, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, variables, or the like.

The various features and processes described above can be used independently of one another, or can be combined in various ways. All possible combinations and subcombinations are intended to fall within the scope of this disclosure. In addition, certain method or process steps can be omitted in some implementations.

While certain embodiments have been described, these embodiments have been presented by way of example only, and are not intended to limit the scope of the disclosure. Indeed, the novel methods and systems described herein can be embodied in a variety of other forms; furthermore, various omissions, substitutions and changes in the form of the methods and systems described herein can be made without departing from the spirit of the disclosure. The accompanying claims and their equivalents are intended to cover such forms or modifications as would fall within the scope and spirit of the disclosure.

What is claimed is:

1. A computer-implemented method of extracting time-series behavior based on time-series information, the method comprising:

displaying, in a graphical user interface, source data that comprises time-series data including time-series data points comprising one or more input components that collectively represent a value from an input space and one or more output components that collectively represent a value from an output space;

designating training data by user selection of at least a portion of the source data;

dividing into fuzzy regions a range of possible values for each component of the time-series data within the designated training data;

assigning with one or more computer processors a fuzzy membership function to each fuzzy region;

generating with one or more computer processors non-conflicting fuzzy rules that are determined at least in part by the fuzzy membership functions and at least in part by how one or more output components of one or more conflicting time-series data points are clustered;

generating a model of time series behavior using at least the non-conflicting fuzzy rules; and displaying, in the graphical user interface, a graphical representation of the generated model.

2. The method of claim 1, further comprising displaying, in the graphical user interface, a graphical representation of the generated model as evaluated on input of source data that was not used as training data.

3. The method of claim 1, wherein the time-series data substantially represents at least in part measurements of input and output operations of a relational database management system.

4. The method of claim 1, wherein designation of the training data comprises retrieving user-selected time-series data from a database and storing the user-selected time-series data in memory, in a file or in databases.

5. The method of claim 1, wherein the input components comprise at least one time-related input component.

6. The method of claim 5, wherein the at least one time-related input component comprises an input component corresponding to a time of day.

7. The method of claim 1, wherein dividing into fuzzy regions a range of possible values for each component of the time-series data within the designated training data comprises, for at least one component of the time-series data, defining the fuzzy regions based at least in part on user input.

8. The method of claim 1, wherein assigning a fuzzy membership function to each fuzzy region comprises assigning a triangular fuzzy membership function to at least one fuzzy region.

9. The method of claim 1, wherein assigning a fuzzy membership function to each fuzzy region comprises assigning a rectangular fuzzy membership function to at least one fuzzy region.

10. The method of claim 1, wherein generating non-conflicting fuzzy rules that are determined at least in part by the fuzzy membership functions and at least in part by how a plurality of the time-series data points are clustered comprises:

generating a fuzzy rule with an antecedent clause from each of a plurality of the time-series data points, where, for a given time-series data point among the plurality of the time-series data points, the fuzzy rule is based on the degree of membership each component of the given time-series data point has with respect to each fuzzy region of the range of possible values for that component and where the degree of membership of a given component with respect to a given fuzzy region is determined by evaluating the fuzzy membership function assigned to the given fuzzy region at the value of the given component; and resolving conflicts among the fuzzy rules, wherein, for a given set of conflicting fuzzy rules, the resolving conflicts comprises:

clustering the one or more output components of the one or more conflicting time-series data points giving rise to the fuzzy rules in the given set of conflicting fuzzy rules;

defining a function for each resulting cluster, the characteristics of each cluster determining at least one relative maximum value of its associated function;

selecting a cluster whose associated function has a relative maximum value equal to the greatest relative maximum value of all the functions associated with a cluster; and creating a fuzzy rule using the antecedent clauses of the fuzzy rules in the given set of conflicting fuzzy rules and a consequent clause determined by an output space value substantially representing the center of the selected cluster.

11. A specially-programmed computer comprising:
a computer processor; and
computer storage storing a plurality of sets of computer-executable instructions that are configured to cause computer hardware to perform operations defined by the instructions, the sets of computer-executable instructions comprising:

a first set of computer-executable instructions defining a graphical user interface that displays source data that comprises time-series data including time-series data points comprising one or more input components that collectively represent a value from an input space and one or more output components that collectively represent a value from an output space and that allows designation of training data by user selection of at least a portion of the source data;

a second set of computer-executable instructions defining a fuzzy region division operation that divides into fuzzy regions a range of possible values for each component of the time-series data within the designated training data;

a third set of computer-executable instructions defining a fuzzy membership function assignment operation that assigns a fuzzy membership function to each fuzzy region;

a fourth set of computer-executable instructions defining a fuzzy rule conflict resolution operation that generates non-conflicting fuzzy rules that are determined at least in part by the fuzzy membership functions and at least in part by how one or more output components of one or more conflicting time-series data points are clustered;

a fifth set of computer-executable instructions defining a model generation operation that generates a model of time series behavior using at least the non-conflicting fuzzy rules; and a sixth set of computer-executable instructions defining a model display operation that displays, in the graphical user interface, a graphical representation of the generated model.

12. The computer of claim 11, wherein the model display operation further displays, in the graphical user interface, a graphical representation of the generated model as evaluated on input of source data that was not used as training data.

13. The computer of claim 11, wherein the time-series data substantially represents at least in part measurements of input and output operations of a relational database management system.

14. The computer of claim 11, wherein designation of the training data comprises retrieving user-selected time-series data from a database and storing the user-selected time-series data in memory, in a file or in databases.

15. The computer of claim 11, wherein the input components comprise at least one time-related input component.

16. The computer of claim 15, wherein the at least one time-related input component comprises an input component corresponding to a time of day.

17. The computer of claim 11, wherein dividing into fuzzy regions a range of possible values for each component of the time-series data within the designated training data comprises, for at least one component of the time-series data, defining the fuzzy regions based at least in part on user input.

18. The computer of claim 11, wherein assigning a fuzzy membership function to each fuzzy region comprises assigning a triangular fuzzy membership function to at least one fuzzy region.

19. The computer of claim 11, wherein assigning a fuzzy membership function to each fuzzy region comprises assigning a rectangular fuzzy membership function to at least one fuzzy region.

20. The computer of claim 11, wherein generating non-conflicting fuzzy rules that are determined at least in part by the fuzzy membership functions and at least in part by how a plurality of the time-series data points are clustered comprises:

generating a fuzzy rule with an antecedent clause from each of a plurality of the time-series data points, where, for a given time-series data point among the plurality of the time-series data points, the fuzzy rule is based on the degree of membership each component of the given time-series data point has with respect to each fuzzy region of the range of possible values for that component and where the degree of membership of a given component with respect to a given fuzzy region is determined by evaluating the fuzzy membership function assigned to the given fuzzy region at the value of the given component; and resolving conflicts among the fuzzy rules, wherein, for a given set of conflicting fuzzy rules, the resolving conflicts comprises:

clustering the one or more output components of the one or more conflicting time-series data points giving rise to the fuzzy rules in the given set of conflicting fuzzy rules;

defining a function for each resulting cluster, the characteristics of each cluster determining at least one relative maximum value of its associated function;

selecting a cluster whose associated function has a relative maximum value equal to the greatest relative maximum value of all the functions associated with a cluster; and creating a fuzzy rule using the antecedent clauses of the fuzzy rules in the given set of conflicting fuzzy rules and a consequent clause determined by an output space value substantially representing the center of the selected cluster.

\* \* \* \* \*